US012613631B2

(12) United States Patent
Song

(10) Patent No.: US 12,613,631 B2
(45) Date of Patent: Apr. 28, 2026

(54) STACK MEMORY DEVICES CONFIGURED TO COMMUNICATE VIA PACKETS

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 1 day.

(21) Appl. No.: 18/771,088

(22) Filed: Jul. 12, 2024

(65) Prior Publication Data

US 2025/0181239 A1    Jun. 5, 2025

Related U.S. Application Data

(63) Continuation-in-part of application No. 18/654,843, filed on May 3, 2024, now Pat. No. 12,423,179.

(30) Foreign Application Priority Data

Dec. 5, 2023    (KR) ........................ 10-2023-0174966

(51) Int. Cl.
G06F 3/06    (2006.01)

(52) U.S. Cl.
CPC .......... G06F 3/0607 (2013.01); G06F 3/0659 (2013.01); G06F 3/0673 (2013.01)

(58) Field of Classification Search
CPC ..... G06F 3/0607; G06F 3/0659; G06F 3/0673
See application file for complete search history.

(56) References Cited

U.S. PATENT DOCUMENTS

| | | | |
|---|---|---|---|
| 2003/0151971 A1 | 8/2003 | Acharya et al. | |
| 2007/0047579 A1* | 3/2007 | Mukhopadhyay ...... | H04J 3/047 |
| | | | 370/469 |
| 2021/0049062 A1 | 2/2021 | Balakrishnan et al. | |
| 2021/0349660 A1* | 11/2021 | Kim ...................... | G06F 18/214 |
| 2022/0100419 A1* | 3/2022 | Jang ...................... | G06F 3/0659 |
| 2023/0360689 A1 | 11/2023 | Park et al. | |
| 2024/0069738 A1* | 2/2024 | Kim ...................... | G06F 3/0688 |
| 2024/0290365 A1 | 8/2024 | Jo | |

FOREIGN PATENT DOCUMENTS

| | | |
|---|---|---|
| EP | 4254413 A2 | 10/2023 |
| KR | 1020170102418 A | 9/2017 |

* cited by examiner

*Primary Examiner* — Yong J Choe
(74) *Attorney, Agent, or Firm* — WILLIAM PARK AND ASSOCIATES LTD.

(57)    ABSTRACT

A stack memory device includes a physical layer configured to receive write data, a write valid signal, and a transmission write clock signal from an external device and transmit read data, a read valid signal, and a transmission read clock signal to the external device, a selector configured to output a signal output from the physical layer through a first channel or a second channel, based on a channel selection signal, and a control layer configured to receive an output signal of the selector through the first channel or the second channel to generate a control command and an address for controlling a write operation or a read operation within a core chip.

19 Claims, 15 Drawing Sheets

10

103-L
103-(L-1)
103-2
103-1

| CCHP |
| CCHP |
| CCHP |
| CCHP |

103

WDATA
WVALID
WCK-t
WCK-c

101

| Rx Tx | SERDES | DATA TR CTR | CORE CTR |

RDATA
RVALID
RCK-t
RCK-c 111    113    115    119

FIG. 4

| PIN<br>BL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 - 7 | B0 | B1 | B2 | B3 | B4 | B5 | B6 | B7 | B8 | B9 | B10 | B11 | B12 | B13 | B14 | B15 |
| 8 - 15 | B16 | B17 | B18 | B19 | B20 | B21 | B22 | B23 | B24 | B25 | B26 | B27 | B28 | B29 | B30 | B31 |
| 16 - 23 | B32 | B33 | B34 | B35 | B36 | B37 | B38 | B39 | B40 | B41 | B42 | B43 | B44 | B45 | B46 | B47 |
| 24 - 31 | B48 | B49 | B50 | B51 | B52 | B53 | B54 | B55 | B56 | B57 | B58 | B59 | B60 | B61 | B62 | B63 |

FIG. 5

| | +0 | +1 | +2 | +3 | +4 | +5 | +6 | +7 | +8 | ... | +63 |
|---|---|---|---|---|---|---|---|---|---|---|---|
| DB1 | HB1 | HB2 | | | | | | | | | |
| DB2 | HB3 | HB4 | CB1 | CB2 | HB5 | HB6 | | | | | |
| DB3 | DB2 | | | | | | CB3 | CB4 | HB7 | HB8 | |

Figure 13:
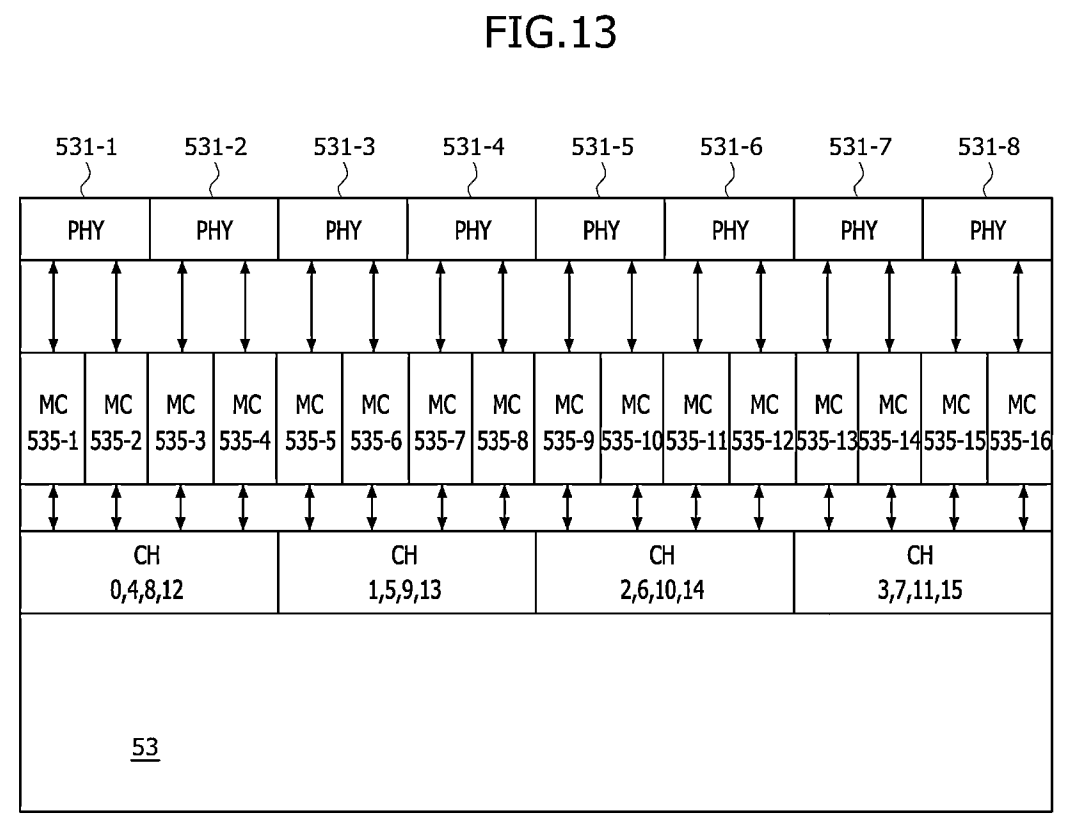

| 531-1 | 531-2 | 531-3 | 531-4 | 531-5 | 531-6 | 531-7 | 531-8 |
|---|---|---|---|---|---|---|---|
| PHY | PHY | PHY | PHY | PHY | PHY | PHY | PHY |
| ↔ | ↔ | ↔ | ↔ | ↔ | ↔ | ↔ | ↔ |

| MC 535-1 | MC 535-2 | MC 535-3 | MC 535-4 | MC 535-5 | MC 535-6 | MC 535-7 | MC 535-8 | MC 535-9 | MC 535-10 | MC 535-11 | MC 535-12 | MC 535-13 | MC 535-14 | MC 535-15 | MC 535-16 |

| ↔ | ↔ | ↔ | ↔ | ↔ | ↔ | ↔ | ↔ |

| CH 0,4,8,12 | CH 1,5,9,13 | CH 2,6,10,14 | CH 3,7,11,15 |

STACK MEMORY DEVICES CONFIGURED TO COMMUNICATE VIA PACKETS

CROSS-REFERENCE TO RELATED APPLICATIONS

The present application is a continuation-in-part application of U.S. patent application Ser. No. 18/654,843, filed on May 3, 2024, which claims priority under 35 U.S.C. § 119 (a) to Korean Application No. 10-2023-0174966, filed on Dec. 5, 2023, in the Korean Intellectual Property Office, which applications are incorporated herein by reference in their entirety.

BACKGROUND

1. Technical Field

Some embodiments of the present disclosure relate to stack memory devices communicating in packets.

2. Related Art

Stack memory systems such as high bandwidth memory (HBM) systems are used in a wide range of applications due to excellent bandwidth and energy efficiency. Unlike existing memory systems that use a parallel data bus, the stack memory system includes a stack memory device composed of a base chip and a plurality of memory chips interconnected by through silicon vias (TSVs, hereinafter referred to as "through-vias"). The stack memory device utilizes a physical interface such as PHY for communicating with a processor, and the PHY needs to be designed to ensure high-speed data transmission and efficient communication.

SUMMARY

A stack memory device according to an embodiment of the present disclosure may include a physical layer configured to receive write data, a write valid signal, and a transmission write clock signal from an external device and transmit read data, a read valid signal, and a transmission read clock signal to the external device, a selector configured to output a signal output from the physical layer through a first channel or a second channel, based on a channel selection signal, and a control layer configured to receive an output signal of the selector through the first channel or the second channel to generate a control command and an address for controlling a write operation or a read operation on a core chip.

A stack memory device according to an embodiment of the present disclosure may include a first physical layer configured to receive a signal from an external device and transmit a signal to the external device, a first selector configured to output a signal output from the first physical layer through a first channel or a second channel, based on a channel selection signal, a first memory control group configured to receive the signal output from the first physical layer through the first channel through the first selector to generate a control command and an address, based on the channel selection signal, and a second memory control group configured to receive the signal output from the first physical layer through the second channel through the first selector to generate the control command and the address, based on the channel selection signal.

A stack memory device according to an embodiment of the present disclosure may include a base chip, and a core chip stacked on the base chip and electrically connected to the base chip. The base chip may include a physical layer configured to receive a signal from an external device and transmit a signal to the external device, a selector configured to output a signal output from the physical layer through a first channel or a second channel, based on a channel selection signal, and a control layer configured to receive an output signal of the selector through the first channel or the second channel to generate a control command and an address for controlling a write operation or a read operation on the core chip.

BRIEF DESCRIPTION OF THE DRAWINGS

FIG. 4 is a table identifying data transferred during input and output operations for a packet according to an embodiment of the present disclosure.

FIG. 5 and FIG. 6 are diagrams illustrating examples of packet formats according to embodiments of the present disclosure.

FIG. 7 is a block diagram illustrating a stack memory device according to another embodiment of the present disclosure.

FIG. 13 is a block diagram illustrating an embodiment of a base chip included in the stack memory device.

FIG. 15 is a block diagram illustrating an embodiment of a base chip included in the stack memory device.

DETAILED DESCRIPTION

In the following description of embodiments, when a parameter is referred to as being "predetermined," a value of the parameter may be determined in advance when the parameter is used in a process or an algorithm. The value of the parameter may be determined when the process or the algorithm starts or may be determined during a period in which the process or the algorithm is executed.

Although the terms "first," "second," "third," and so forth are used herein to describe various elements, these elements should not be limited by these terms. These terms are only used to distinguish one element from another element and are not intended to imply an order or number of elements. Thus, a first element in some embodiments may be termed a second element in other embodiments without departing from the teachings of the present disclosure.

When an element is referred to as "connected" or "coupled" to another element, the element may be directly connected or coupled to the other element or intervening elements may be present. When an element is referred to as "directly connected" or "directly coupled" to another element, no intervening elements are present.

A logic "high" level and a logic "low" level may be used to describe logic levels of electric signals. A signal at a logic "high" level is distinguished from a signal at a logic "low" level. For example, when a signal at a first voltage corresponds to a signal at a logic "high" level, a signal at a second voltage corresponds to a signal at a logic "low" level. In an embodiment, the logic "high" level may be a voltage level that is higher than a voltage level of the logic "low" level. Logic levels of signals may be different or opposite according to the embodiments. For example, a certain signal at a logic "high" level in one embodiment may be at a logic "low" level in another embodiment.

The term "logic bit set" may include a combination of logic levels of bits included in a signal. When the logic level of each of the bits included in the signal is changed, the logic bit set of the signal may be different. For example, when the signal includes two bits, when the logic level of each of the two bits included in the signal is "logic low level, logic low level," the logic bit set of the signal may be the first logic bit set, and when the logic level of each of the two bits included in the signal is "a logic low level and a logic high level," the logic bit set of the signal may be the second logic bit set.

Various embodiments of the present disclosure are described in more detail with reference to the accompanying drawings. The embodiments are described for illustrative purposes only and are not intended to limit the scope of the present disclosure.

Figure 1:
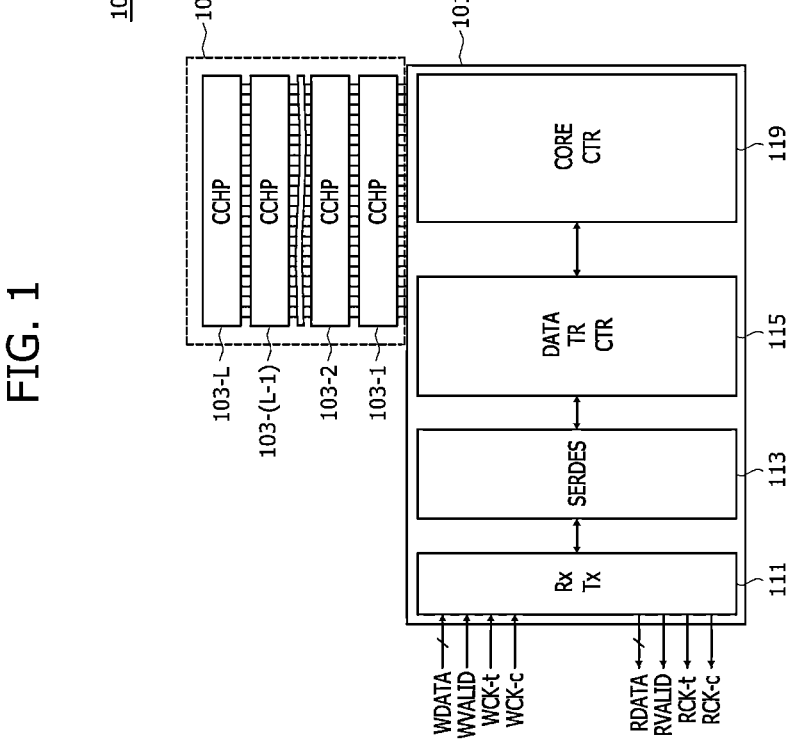
FIG. 1 is a block diagram illustrating a stack memory device according to an embodiment of the present disclosure.

FIG. 1 is a block diagram illustrating a stack memory device 10 according to an embodiment of the present disclosure. As shown in FIG. 1, the stack memory device 10 includes a base chip 101 and a core chip 103. The core chip 103 may be disposed on, with, or over the base chip 101. The core chip 103 may include a plurality (L) of core chips 103-1 through 103-L. Each of the plurality of core chips 103-1 through 103-L may be connected to one or more through-vias (for example, 441 in FIG. 10), and be disposed in a stacked form. The core chip 103 may receive various signals from and exchange data with the base chip 101 through the one or more through-vias.

The base chip 101 includes a transmission/reception circuit (Rx Tx) 111, a serialization/parallelization circuit (SERDES) 113, a data transmission control circuit (DATA TR CTR) 115, and a core control circuit (CORE CTR) 119.

The transmission/reception circuit 111 receives write data WDATA, a write valid signal WVALID, and transmission write clock signals WCK-t and WCK-c from an external device such as a processor (for example, 403 in FIG. 10) for a write operation and a read operation on the core chip 103. When the read operation is performed on the core chip 103, the transmission/reception circuit 111 transmits read data RDATA, a read valid signal RVALID, and transmission read clock signals RCK-t and RCK-c to the external device.

The serialization/parallelization circuit 113 receives the write data WDATA, generates a parallelized input packet (for example, BI in FIG. 2), and provides the parallelized input packet to the data transmission control circuit 115 when the write valid signal WVALID is activated in synchronization with the transmission write clock signals WCK-t and WCK-c. When the read operation is performed on the core chip 103, the serialization/parallelization circuit 113 extracts serialized read data RDATA and the read valid signal RVALID from an output packet (for example, BO in FIG. 2) generated based on internal data IDQ output from the core chip 103 and provides the serialized read data RDATA and the read valid signal RVALID to the transmission/reception circuit 111.

The data transmission control circuit 115 decodes the input packet (for example, BI in FIG. 2) to check whether any error is detected in the internal data IDQ extracted from the input packet BI when the write operation is performed on the core chip 103, and stores the internal data IDQ in the core chip 103 through the core control circuit 119. When the read operation is performed on the core chip 103, the data transmission control circuit 115 checks whether any error is detected in the internal data IDQ output from the core chip 103 and provides an output packet (for example, BO in FIG. 2) generated based on the internal data IDQ to the serialization/parallelization circuit 113. The internal data IDQ extracted from the input packet BI when the write operation is performed on the internal data IDQ and the internal data IDQ output from the core chip 103 when the read operation is performed on the core chip 103 may be separate signals transmitted through the same signal line.

When the write operation is performed on the core chip 103, the core control circuit 119 receives the internal data IDQ and controls the core chip 103 such that the internal data IDQ is stored in the core chip 103. When the read operation is performed on the core chip 103, the core control circuit 119 receives the internal data IDQ output from the core chip 103 to provide the internal data IDQ to the data transmission control circuit 115.

The stack memory device 10 configured as described above uses packets (for example, BI and BO in FIG. 2) when performing the write operation and read operation on the core chip 103, thereby improving scalability and performing high-speed operations when applied to or used in stack memory systems.

Figure 2:
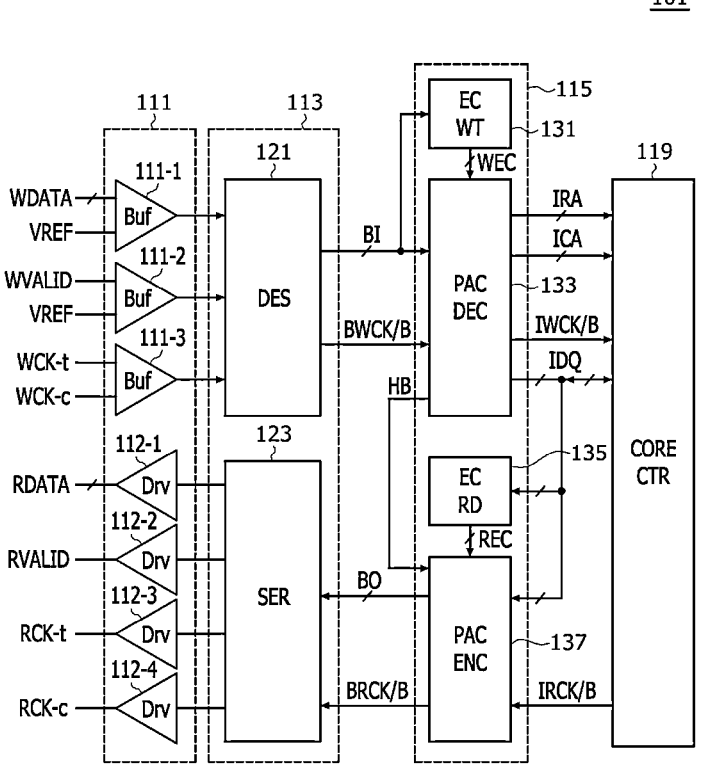
FIG. 2 is a block diagram illustrating an embodiment of a base chip included in the stack memory device.

FIG. 2 is a block diagram illustrating an embodiment of the base chip 101 such as shown in FIG. 1. As shown in FIG. 2, the base chip 101 includes a transmission/reception circuit 111, a serialization/parallelization circuit 113, a data transmission control circuit 115, and a core control circuit 119.

The transmission/reception circuit 111 includes reception buffers 111-1, 111-2, and 111-3 and transmission drivers 112-1, 112-2, 112-3, and 112-4. The reception buffer 111-1 buffers the write data WDATA received serially from an external device, based on a reference voltage VREF, and provides the buffered write data WDATA to the serialization/parallelization circuit 113. The reception buffer 111-2 receives and buffers the write valid signal WVALID, based on the reference voltage VREF, and provides the buffered write valid signal WVALID to the serialization/parallelization circuit 113. The reception buffer 111-3 receives and buffers the transmission write clock signals WCK-t and WCK-c and provides the buffered transmission write clock signals WCK-t and WCK-c to the serialization/parallelization circuit 113. The transmission driver 112-1 transmits the read data RDATA received serially from the serialization/parallelization circuit 113 to the external device. The transmission driver 112-2 transmits the read valid signal RVALID received from the serialization/parallelization circuit 113 to the external device. The transmission drivers 112-3 and 112-4 transmit the transmission read clock signals RCK-t and RCK-c received from the serialization/parallelization circuit 113 to the external device.

The serialization/parallelization circuit 113 includes a parallelization circuit 121 and a serialization circuit 123.

The parallelization circuit 121 is electrically connected to the reception buffers 111-1, 111-2, and 111-3 and receives the write data WDATA, the write valid signal WVALID, and the transmission write clock signals WCK-t and WCK-c. The parallelization circuit 121 receives the write data WDATA to generate and output the parallelized input packet BI when the write valid signal WVALID is activated in synchronization with the transmission write clock signals WCK-t and WCK-c. The parallelization circuit 121 outputs the transmission write clock signals WCK-t and WCK-c as a buffer write clock signal BWCK/B. The parallelization circuit 121 is electrically connected to the data transmission control circuit 115 and provides the input packet BI and the buffer write clock signal BWCK/B to the data transmission control circuit 115. The input packet BI may be implemented or formatted as a packet used in peripheral component interconnect express (PCIe) and compute express link (CXL) protocols. PCIe and CXL are high-speed interface standards used to connect various hardware components such as graphics cards, storage devices, network cards, and the like, to each other. The input packet BI may include header information including information such as destination and packet type, information about internal control signals that control internal operations, data information stored in the core chip 103, error control information used to detect errors, and security information to prevent data sharing.

The serialization circuit 123 is electrically connected to the data transmission control circuit 115 and receives the output packet BO and a buffer read clock signal BRCK/B from the data transmission control circuit 115. The serialization circuit 123 extracts the read data RDATA and the read valid signal RVALID from the output packet BO in synchronization with the buffer read clock signal BRCK/B to provide serialized read data RDATA to the transmission driver 112-1 and provide the read valid signal RVALID to the transmission driver 112-2. The serialization circuit 123 generates transmission read clock signals RCK-t and RCK-c from the buffer read clock signal BRCK/B and provides the transmission read clock signals RCK-t and RCK-c to the transmission drivers 112-3 and 112-4, respectively.

The data transmission control circuit 115 includes a write error check circuit (EC WT) 131, a packet decoder (PAC DEC) 133, a read error check circuit (EC RD) 135, and a packet encoder (PAC ENC) 137.

The write error check circuit 131 is electrically connected to the parallelization circuit 121 and receives the input packet BI from the parallelization circuit 121. The write error check circuit 131 generates a write error check code WEC based on the input packet BI. The write error check circuit 131 may apply a cyclic redundancy check (CRC) algorithm to generate the write error check code WEC as a checksum that can be utilized to check for the errors in the internal data IDQ.

The packet decoder 133 is electrically connected to the parallelization circuit 121 and the write error check circuit 131, receives the input packet BI and the buffer write clock signal BWCK/B from the parallelization circuit 121, and receives the write error check code WEC from the write error check circuit 131. The packet decoder 133 checks whether any error is in the input packet BI based on the write error check code WEC. When at least one error is detected in the input packet BI, based on the write error check code WEC during the write operation on the core chip 103, the packet decoder 133 may receive the input packet BI again from the parallelization circuit 121. The packet decoder 133 decodes the input packet BI in synchronization with the buffer write clock signal BWCK/B to generate an internal row control signal IRA and an internal column control signal ICA. The internal row control signal IRA may be a signal utilized in row-series operations such as an active operation and a pre-charge operation on the core chip 103, and the internal column control signal ICA may be a signal utilized in column-series operations such as a read operation and a write operation on the core chip 103. The packet decoder 133 generates an internal write clock signal IWCK/B, based on the buffer write clock signal BWCK/B. For example, the internal write clock signal IWCK/B may be implemented in the same way as the buffer write clock signal BWCK/B. The present disclosure is not limited to this example. The packet decoder 133 decodes the input packet BI to extract header information HB and the internal data IDQ when the write operation is performed on the core chip 103. The input packet BI may include header information HB including information such as the destination and packet type, data information including control signals to control operations, error security information for error detection or security, and the like. The packet decoder 133 is electrically connected to the core control circuit 119 and provides the internal data IDQ to the core control circuit 119 in order to store the internal data IDQ in the core chip 103 when the write operation is performed on the core chip 103.

The read error check circuit 135 is electrically connected to the core control circuit 119 and receives the internal data IDQ from the core control circuit 119. The read error check circuit 135 generates a read error check code REC based on the internal data IDQ. The read error check circuit 135 may apply a cyclic redundancy check (CRC) algorithm to generate the read error check code REC as a checksum that can be utilized to check for the errors in the internal data IDQ.

The packet encoder 137 is electrically connected to the packet decoder 133, the read error check circuit 135, and the core control circuit 119 and receives the header information HB from the packet decoder 133, receives the read error check code REC from the read error check circuit 135, and receives an internal read clock signal IRCK/B from the core control circuit 119. The packet encoder 137 receives the internal data IDQ from the core control circuit 119 when the read operation is performed on the core chip 103. The packet encoder 137 checks whether any error is in the internal data IDQ received during the read operation on the core chip 103 based on the read error check code REC. When at least one error is detected in the internal data IDQ based on the read error check code REC during the read operation on the core chip 103, the packet encoder 137 may receive the internal data IDQ again from the core chip 103 through the core control circuit 119. The packet encoder 137 generates the output packet BO based on the header information HB and the internal data IDQ. The output packet BO may be a packet used in PCIe and CXL protocols. The packet encoder 137 generates the buffer read clock signal BRCK/B based on the internal read clock signal IRCK/B. For example, the buffer read clock signal BRCK/B may be implemented in the same manner as the internal read clock signal IRCK/B. The present disclosure is not limited to this example.

The core control circuit 119 is electrically connected to the packet decoder 133 and receives the internal row control signal IRA, the internal column control signal ICA, the internal write clock signal IWCK/B, and the internal data IDQ from the packet decoder 133. The core control circuit 119 receives the internal write clock signal IWCK/B and the internal data IDQ from the packet decoder 133 when the write operation is performed on the core chip 103 based on the internal row control signal IRA and the internal column control signal ICA. The core control circuit 119 controls the core chip 103 such that the internal data IDQ is stored in the core chip 103 in synchronization with the internal write clock signal IWCK/B when the write operation is performed on the core chip 103. The core control circuit 119 provides the internal data IDQ as the data output from the core chip 103 to the packet encoder 137 when the read operation is performed on the core chip 103. The core control circuit 119 provides the internal read clock signal IRCK/B to the packet encoder 137 when the read operation is performed on the core chip 103.

The operation of the stack memory device 10 configured as described above is described as follows with respect to two examples, an example in which a write operation is performed on the core chip 103 and an example in which a read operation is performed on the core chip 103.

For the write operation on the core chip 103, the parallelization circuit 121 receives the write data WDATA, the write valid signal WVAID, and the transmission write clock signals WCK-t and WC-c from the reception buffers 111-1, 111-2, and 111-3 and receives the write data WDATA to generate the parallelized input packet BI when the write valid signal WVALID is activated in synchronization with the transmission write clock signals WCK-t and WC-c. The packet decoder 133 checks whether any error is in the input packet BI based on the write error check code WEC and receives the input packet BI again when at least one error is detected in the input packet BI. The packet decoder 133 decodes the input packet BI to generate the internal row control signal IRA and the internal column control signal ICA. The core control circuit 119 receives the internal write clock signal IWCK/B and the internal data IDQ from the packet decoder 133 when the write operation is performed on the core chip 103 based on the internal row control signal IRA and the internal column control signal ICA and controls the core chip 103 such that the internal data IDQ is stored in the core chip 103 in synchronization with the internal write clock signal IWCK/B.

For the read operation on the core chip 103, the parallelization circuit 121 receives the write data WDATA, the write valid signal WVALID, and the transmission write clock signals WCK-t and WCK-c from the reception buffers 111-1, 111-2, and 111-3 and receives the write data WDATA to generate the parallelized input packet BI when the write valid signal WVALID is activated in synchronization with the transmission write clock signals WCK-t and WCK-c. The packet decoder 133 checks whether any error is in the input packet BI based on the write error check code WEC and receives the input packet BI again when at least one error is in the input packet BI. The packet decoder 133 may decode the input packet BI to generate the header information HB, the internal row control signal IRA, and the internal column control signal ICA. The core control circuit 119 may output the data output from the core chip 103 as the internal data IDQ when the read operation is performed on the core chip 103 based on the internal row control signal IRA and the internal column control signal ICA. The read error check circuit 135 may generate the read error check code REC, based on the internal data IDQ. The packet encoder 137 may check whether any error is in the internal data IDQ, based on the read error check code REC, and receive the internal data IDQ again when at least one error is detected in the internal data IDQ. The packet encoder 137 may generate the output packet BO, based on the header information HB and the internal data IDQ. The serialization circuit 123 extracts the read data RDATA and the read valid signal RVALID from the output packet BO in synchronization with the buffer read clock signal BRCK/B to provide serialized read data RDATA to the transmission driver 112-1, and provide the read valid signal RVALID to the transmission driver 112-2. The serialization circuit 123 generates the transmission read clock signals RCK-t and RCK-c from the buffer read clock signal BRCK/B and provides the transmission read clock signals RCK-t and RCK-c to the transmission drivers 112-3 and 112-4. The transmission drivers 112-1, 112-2, 112-3, and 112-4 provide the read data RDATA, the read valid signal RVALID, and the transmission read clock signals RCK-t and RCK-c to an external device.

Figure 3:
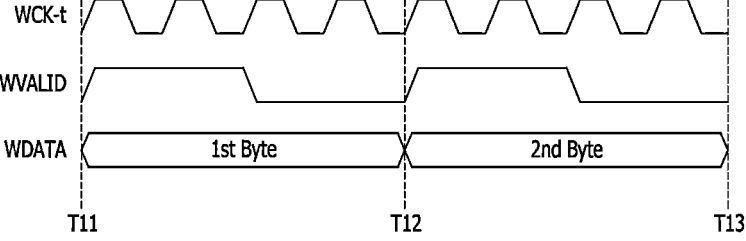
FIG. 3 is a timing diagram illustrating timing of a write operation of a stack memory device according to an embodiment of the present disclosure.

FIG. 3 is a timing diagram illustrating timing of a write operation in which the write data WDATA is transmitted in synchronization with the write valid signal WVALID during the write operation of the stack memory device 10 such as shown in FIG. 1.

Referring to FIG. 2 and FIG. 3, when the write operation is performed in the stack memory device 10, the write data WDATA is received by the transmission/reception circuit 111 based on the transmission write clock signal WCK-t and the write valid signal WVALID. More specifically, when the write valid signal WVALID is activated for the first time in synchronization with the transmission write clock signal WCK-t from time period T11 through T12, the first Byte (1st Byte) of the write valid signal WVALID is received, and when the write valid signal WVALID is activated for the second time in synchronization with the transmission write clock signal WCK-t from time period T12 through T13, the second Byte (2nd Byte) of the write valid signal WVALID is received. In one example, the write valid signal WVALID is activated at a logic "high" level during the preset time periods for receiving the write valid signal WVALID, although the present disclosure is not limited to this example.

FIG. 4 is a table identifying data transferred during the operations of inputting and outputting packets according to an embodiment of the present disclosure. The operations of inputting and outputting a packet consisting of 64 Bytes through 16 pins (PIN) are described with reference to FIG. 4. The pins may be any form of electrical connection between devices, for example, between the base chip 101 and the core chip 103.

During the first burst length (BL0-7) period, the first 16 Bytes B0 through B15 are input and output through the first pin PIN0 through the sixteenth pin PIN15. The second 16 Bytes B16 through B31 are input and output through the first pin PIN0 through the sixteenth pin PIN15 during the second burst length (BL8-15) period. The third 16 Bytes B32 through B47 are input and output through the first pin PIN0 through the sixteenth pin PIN15 during the third burst length (BL16-23) period. The fourth 16 Bytes B48 through B63 are input and output through the first pin PIN0 through the sixteenth pin PIN15 during the fourth burst length (BL24-31) period. The data input and output operations may be performed in order from the top row to the bottom row of the table of FIG. 4 or in a different order. In this example, the operations of inputting and outputting the packet consisting of 64 Bytes through 16 pins during 4 burst length periods (BL0-31) is described, although the present disclosure is not limited to this example.

Figure 5:
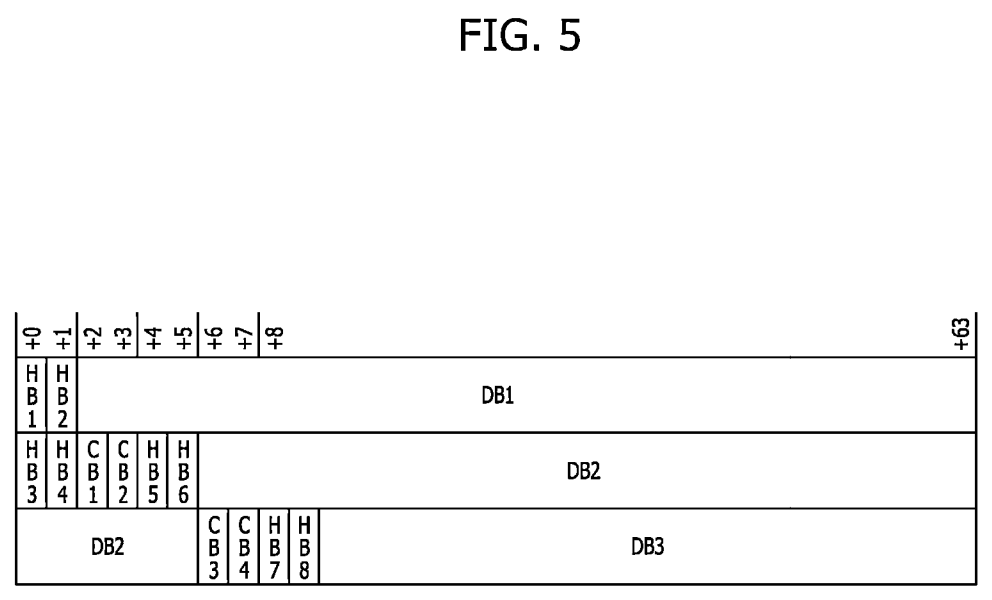
Figure 6:
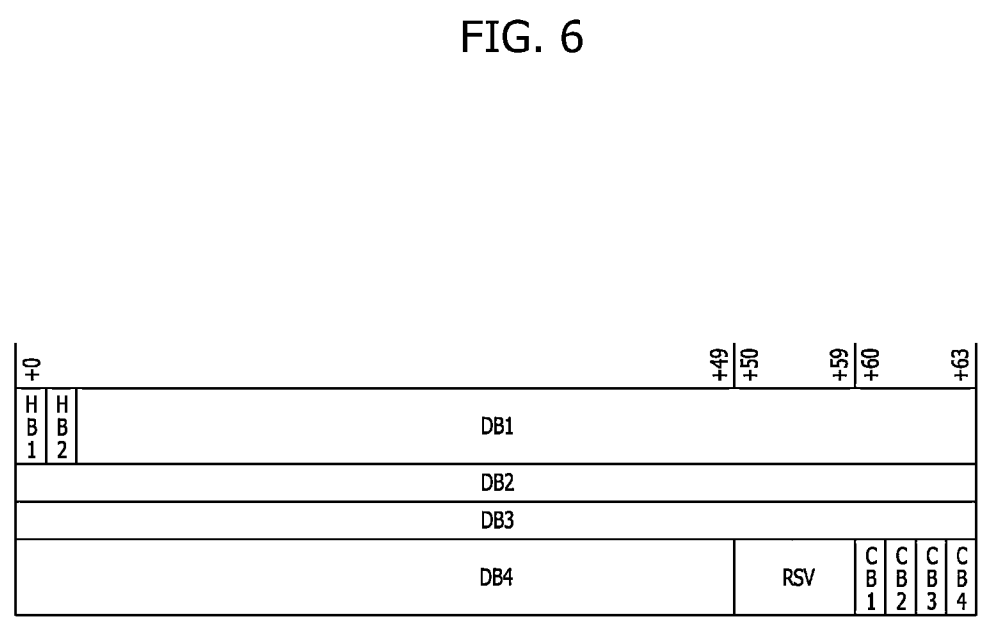

FIG. 5 and FIG. 6 are diagrams illustrating examples of packet formats according to embodiments of the present disclosure. As shown in FIG. 5, the packet, according to an example, is composed of 192 Bytes, including three blocks each composed of 64 Bytes. The first block in the packet includes 2 Bytes of header information HB1 and HB2 and 62 Bytes of information DB1. The second block in the packet include 4 Bytes of header information HB3, HB4, HB5, and HB6, 2 Bytes of error control information CB1 and CB2, and 58 Bytes of information DB2. The third block in the packet includes 2 Bytes of header information HB7 and HB8, 2 Bytes of error control information CB3 and CB4, and 60 bytes of information DB2 and DB3.

As shown in FIG. 6, the packet according to another example is composed of 256 Bytes, including 4 blocks each composed of 64 Bytes. The first block included in the packet may include 2 Bytes of header information HB1 and HB2 and 62 Bytes of information DB1. The second block included in the packet may include 64 Bytes of information DB2. The third block included in the packet may include 64 Bytes of information DB3. The fourth block included in the packet may include 10 Bytes of reservation information RSV, 4 Bytes of error control information CB3 and CB4, and 50 Bytes of information DB4. The reservation information RSV may include information secured or kept aside for subsequent use.

The configurations of the packet discussed above are only examples, and the numbers of Bytes included in the packet, the numbers of Bytes included in the blocks and the header information, error control information, and arrangement of the internal control signals may be implemented in various ways depending on the embodiment.

Figure 7:
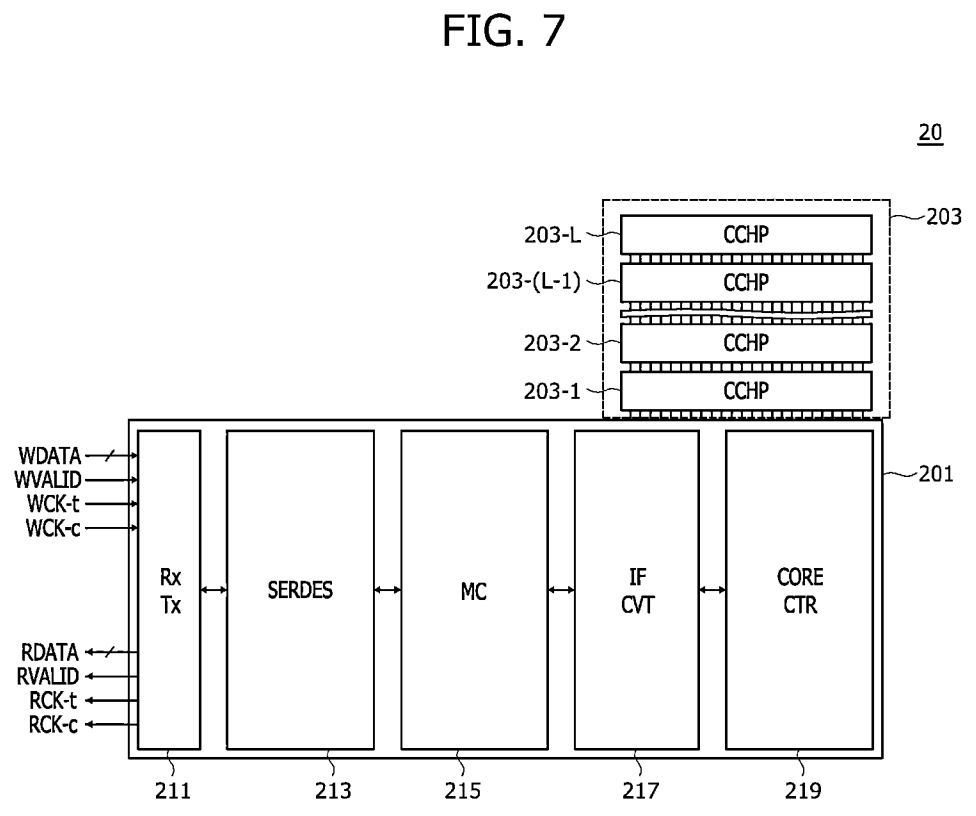

FIG. 7 is a block diagram illustrating a stack memory device 20 according to another embodiment of the present disclosure. As shown in FIG. 7, the stack memory device 20 includes a base chip 201 and a core chip 203. The core chip 203 may be disposed on, with, or over the base chip 201. The core chip 203 may include a plurality of core chips 203-1 through 203-L. Each of the plurality (L) of core chips 203-1 through 203-L may be connected to each other through one or more through-vias (for example, 441 in FIG. 10), and may be disposed in a stacked form. The core chip 203 may receive various signals from and exchange data with the base chip 201 through the one or more through-vias.

The base chip 201 includes a transmission/reception circuit (Rx Tx) 211, a serialization/parallelization circuit (SERDES) 213, a memory controller (MC) 215, an interface converting circuit (IF CVT) 217, and a core control circuit (CORE CTR) 219.

The transmission/reception circuit 211 receives write data WDATA, a write valid signal WVALID, and transmission write clock signals WCK-t and WCK-c from an external device such as a processor (for example, 403 in FIG. 10) for a write operation and a read operation on the core chip 203. The transmission/reception circuit 211 transmits read data RDATA, a read valid signal RVALID, and transmission read clock signals RCK-t and RCK-c to the external device for the read operation on the core chip 203.

The serialization/parallelization circuit 213 receives the write data WDATA to generate a parallelized input packet (for example, BI in FIG. 8) and provides the parallelized input packet (for example, BI in FIG. 8) to the memory controller 215 when the write valid signal WVALID is activated in synchronization with the transmission write clock signals WCK-t and WCK-c. When a read operation is performed, the serialization/parallelization circuit 213 extracts serialized read data RDATA and a read valid signal RVALID from an output packet (for example, BO in FIG. 8) generated based on internal data IDQ output from the core chip 203 and provides the serialized read data RDATA and the read valid signal RVALID to the transmission/reception circuit 211.

Figure 8:
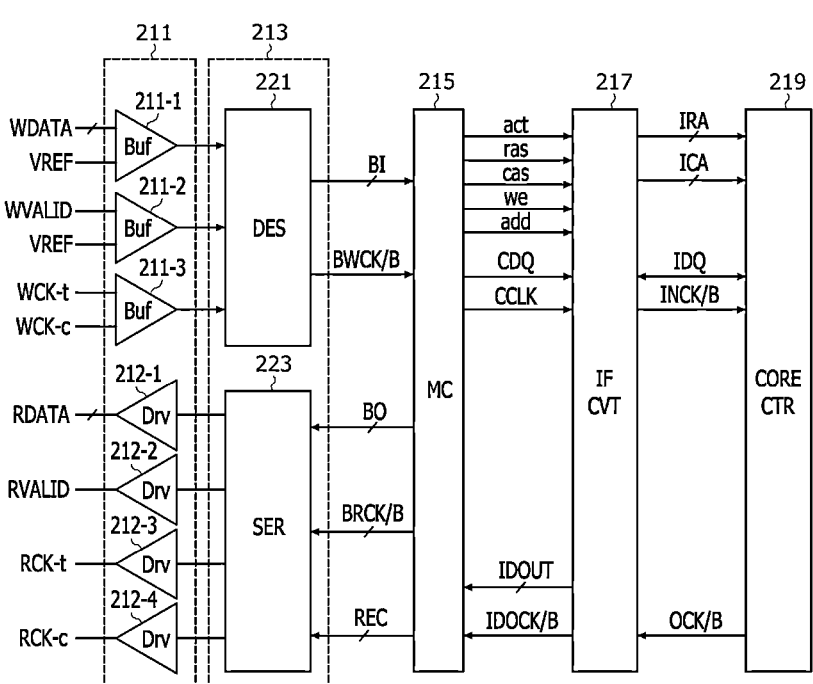
FIG. 8 is a block diagram illustrating an embodiment of a base chip included in the stack memory device.

The memory controller 215 generates control commands (for example, act, ras, cas, and we in FIG. 8) for controlling internal operations on the core chip 203 and an address (for example, add in FIG. 8) based on the input packet (for example, BI in FIG. 8). The memory controller 215 extracts control data (for example, CDQ in FIG. 8) from the input packet (for example, BI in FIG. 8) when a write operation is performed on the core chip 203. The memory controller 215 generates the output packet (for example, BO in FIG. 8) and a read error check code (for example, REC in FIG. 8) based on internal output data (for example, IDOUT in FIG. 8) when a read operation is performed on the core chip 203.

The interface converting circuit 217 converts the control commands (for example, act, ras, cas, and we in FIG. 8) into an internal row control signal (for example, IRA in FIG. 8) and an internal column control signal (for example, ICA in FIG. 8). The interface converting circuit 217 converts the control data CDQ into the internal data IDQ via an interface to the memory controller 215 and provides the internal data IDQ via an interface to the core control circuit 219 to perform operations on the core chip 203 when the write operation is performed on the core chip 203. The interface converting circuit 217 converts the internal data IDQ into the internal output data IDOUT via the interface to the control circuit 219 and provides the internal output data IDOUT to the interface to the memory controller 215 when the read operation is performed on the core chip 203.

The core control circuit 219 receives the internal data IDQ from the interface converting circuit 217 and stores the internal data IDQ in the core chip 203 when the write operation is performed on the core chip 203. The core control circuit 219 receives the internal data IDQ output from the core chip 203 and provides the internal data IDQ to the interface converting circuit 217 when the read operation is performed on the core chip 203.

The stack memory device 20 configured as described above uses packets (for example, BI and BO in FIG. 8) when performing write and read operations on the core chip 203, thereby improving scalability and performing high-speed operations when applied to or used in a stacked memory system. In addition, the stack memory device 20 may be provided with the memory controller 215 that operates with different interfaces through the interface converting circuit 217, thereby providing system-on-chip high-speed operations.

FIG. 8 is a block diagram illustrating an embodiment of the base chip 201 such as shown in FIG. 7. As shown in FIG. 8, the base chip 201 includes a transmission/reception circuit 211, a serialization/parallelization circuit 213, a memory controller 215, an interface converting circuit 217, and a core control circuit 219.

The transmission/reception circuit 211 includes reception buffers 211-1, 211-2, and 211-3 and transmission drivers 212-1, 212-2, 212-3, and 212-4. The reception buffer 211-1 buffers the write data WDATA received serially from an external device, based on a reference voltage VREF, and provides the buffered write data WDATA to the serialization/parallelization circuit 213. The reception buffer 211-2 receives and buffers the write valid signal WVALID, based on the reference voltage VREF, and provides the buffered write valid signal WVALID to the serialization/parallelization circuit 213. The reception buffer 211-3 receives and buffers the transmission write clock signals WCK-t and WCK-c and provides the buffered transmission write clock signals WCK-t and WCK-c to the serialization/parallelization circuit 213. The transmission driver 212-1 transmits the read data RDATA received serially from the serialization/parallelization circuit 213 to the external device. The transmission driver 212-2 transmits the read valid signal RVALID received from the serialization/parallelization circuit 213 to the external device. The transmission drivers 212-3 and 212-4 transmits the transmission read clock signals RCK-t and RCK-c received from the serialization/parallelization circuit 213 to the external device.

The serialization/parallelization circuit 213 includes a parallelization circuit 221 and a serialization circuit 223.

The parallelization circuit 221 is electrically connected to the reception buffers 211-1, 211-2, and 211-3 and receives the write data WDATA, the write valid signal WVALID, and the transmission write clock signals WCK-t and WCK-c. The parallelization circuit 221 receives the write data WDATA to generate and output the parallelized input packet BI when the write valid signal WVALID is activated in synchronization with the transmission write clock signals WCK-t and WCK-c. The parallelization circuit 221 outputs the transmission write clock signals WCK-t and WCK-c as the buffer write clock signal BWCK/B. The parallelization circuit 221 is electrically connected to the memory controller 215 and provides the input packet BI and the buffer write clock signal BWCK/B to the memory controller 215. The input packet BI may be implemented or formatted as a packet used in the PCIe and CXL protocols.

The serialization circuit 223 is electrically connected to the memory controller 215 and receives the output packet BO, the buffer read clock signal BRCK/B, and the read error check code REC from the memory controller 215. The serialization circuit 223 may receive the output packet BO again from the memory controller 215 when at least one error is detected in the output packet BO based on the read error check code REC. The serialization circuit 223 extracts the read data RDATA and the read valid signal RVALID from the output packet BO in synchronization with the buffer read clock signal BRCK/B and provides the serialized read data RDATA to the transmission driver 212-1 and provide the read valid signal RVALID to the transmission driver 212-2. The serialization circuit 223 generates the transmission read clock signals RCK-t and RCK-c from the buffer read clock signal BRCK/B and provides the transmission read clock signals RCK-t and RCK-c to the transmission drivers 212-3 and 212-4, respectively. The output packet BO may be implemented or formatted as a packet used in the PCIe and CXL protocols.

The memory controller 215 is electrically connected to the serialization/parallelization circuit 213 and the interface converting circuit 217, receives the input packet BI and the buffer write clock signal BWCK/B from the serialization/parallelization circuit 213, and receives the internal output data IDOUT and the internal output clock signal IDOCK/B from the interface converting circuit 217. The memory controller 215 generates control commands act, ras, cas, and we for controlling the internal operations on the core chip 203 and an address add based on the input packet BI and the buffer write clock signal BWCK/B. The internal operations on the core chip 203 include an active operation, a read operation, a write operation, a pre-charge operation, and the like. When a write operation is performed on the core chip 203, the memory controller 215 extracts control data CDQ from the input packet BI and generates a control clock signal CCLK from the buffer write clock signal BWCK/B and provides the control data CDQ and the control clock signal CCLK to the interface converting circuit 217. When a read operation is performed on the core chip 203, the memory controller 215 provides to the serialization/parallelization circuit 213 the output packet BO, the buffer read clock signal BRCK/B, and the read error check code REC generated based on the internal output data IDOUT and the internal output clock signal IDOCK/B. The read error check code REC may be generated based on a cyclic redundancy check (CRC) algorithm.

The interface converting circuit 217 is electrically connected to the memory controller 215 and the core control circuit 219 and receives the control commands act, ras, cas, and we, the address add, the control data CDQ, and the control clock signal CCLK from the memory controller 215 and receives the internal data IDQ and the output clock signal OCK/B from the core control circuit 219. The interface converting circuit 217 converts the control commands act, ras, cas, and we and the address add into an internal row control signal IRA and an internal column control signal ICA and provides the internal row control signal IRA and the internal column control signal ICA to the core control circuit 219. The control commands act, ras, cas, and we and the address add may be provided by an interface to the memory controller 215, and the internal row control signal IRA and the internal column control signal ICA may be provided by an interface to the core control circuit 219 that utilizes the internal row control signal IRA and the internal column control signal ICA to perform operations on the core chip 203. The method by which the control commands act, ras, cas, and we and the addresses add are converted into the internal row control signal IRA and the internal column control signal ICA may be determined in various ways depending on the embodiment.

When a write operation is performed on the core chip 203, the interface converting circuit 217 converts the control data CDQ and the control clock signal CCLK into the internal data IDQ and an input clock signal INCK/B and provides the internal data IDQ and the input clock signal INCK/B to the core control circuit 219. The control data CDQ and the control clock signal CCLK may be provided by the interface to the memory controller 215, and the internal data IDQ and the input clock signal INCK/B may be provided by the interface to the core control circuit 219 based on operations with the core chip 203. The method by which the control data CDQ and the control clock signal CCLK are converted into the internal data IDQ and the input clock signal INCK/B may be determined in various ways depending on the embodiment. When the read operation is performed on the core chip 203, the interface converting circuit 217 converts the internal data IDQ and the output clock signal OCK/B into the internal output data IDOUT and the internal output clock signal IDOCK/B and provides the internal output data IDOUT and the internal output clock signal IDOCK/B to the memory controller 215. The internal data IDQ and the output clock signal OCK/B may be provided by the interface to the core control circuit 219 based on operations with the core chip 203, and the internal output data IDOUT and the internal output clock signal IDOCK/B may be provided by the interface to the memory controller 215. The method by which the internal data IDQ and the output clock signal OCK/B are converted into the internal output data IDOUT and the internal output clock signal IDOCK/B may be determined in various ways depending on the embodiment.

The core control circuit 219 receives the internal data IDQ and the input clock signal INCK/B from the interface converting circuit 217 when the write operation is performed on the core chip 203 based on the internal row control signal IRA and the internal column control signal ICA. The core control circuit 219 controls the core chip 203 such that the internal data IDQ is stored in the core chip 203 in synchronization with the input clock signal INCK/B when the write operation is performed on the core chip 203. The core control circuit 219 provides the data output from the core chip 203 as the internal data IDQ to the interface converting circuit 217 when the read operation is performed on the core chip 203. The core control circuit 219 provides the output clock signal OCK/B to the interface converting circuit 217 when the read operation is performed on the core chip 203.

The operation of the stack memory device 20 configured as described above is described as follows with respect to two examples, an example in which a write operation is performed on the core chip 203 and an example in which a read operation is performed on the core chip 203.

For the write operation on the core chip 203, the parallelization circuit 221 receives the write data WDATA, the write valid signal WVALID, and the transmission write clock signals WCK-t and WCK-c from the reception buffers 211-1, 211-2, and 211-3 and receives the write data WDATA when the write valid signal WVALID is activated in synchronization with the transmission write clock signals WCK-t and WCK-c to generate the parallelized input packet BI. The memory controller 215 generates the control commands act, ras, cas, and we and the address add based on the input packet BI and the buffer write clock signal BWCK/B, extracts the control data CDQ from the input packet BI, and generates the control clock signal CCLK from the buffer write clock signal BWCK/B. The interface converting circuit 217 converts the control commands act, ras, cas, and we into the internal row control signal IRA and the internal column control signal ICA and converts the control data CDQ and the control clock signal CCLK into the internal data IDQ and the input clock signal INCK/B, respectively. The core control circuit 219 controls the core chip 203 such that the internal data IDQ is stored in the core chip 203 in synchronization with the input clock signal INCK/B.

For a read operation on the core chip 203, the parallelization circuit 221 receives the write data WDATA, the write valid signal WVALID, and the transmission write clock signals WCK-t and WCK-c from the reception buffers 211-1, 211-2, and 211-3 and receives the write data WDATA to generate the parallelized input packet BI when the write valid signal WVALID is activated in synchronization with the transmission write clock signals WCK-t and WCK-c. The memory controller 215 generates the control commands act, ras, cas, and we and the address add based on the input packet BI and the buffer write clock signal BWCK/B, extracts the control data CDQ from the input packet BI, and generates the control clock signal CCLK from the buffer write clock signal BWCK/B. The interface converting circuit 217 converts the control commands act, ras, cas, and we into the internal row control signal IRA and the internal column control signal ICA. The core control circuit 219 outputs the data output from the core chip 203 as the internal data IDQ and outputs the output clock signal OCK/B based on the internal row control signal IRA and the internal column control signal ICA. The interface converting circuit 217 converts the internal data IDQ and the output clock signal OCK/B into the internal output data IDOUT and the internal output clock signal IDOCK/B. The memory controller 215 generates the output packet BO, the buffer read clock signal BRCK/B, and the read error check code REC, based on the internal output data IDOUT and the internal output clock signal IDOCK/B. The serialization circuit 223 receives the output packet BO again from the memory controller 215 when at least one error is detected in the output packet BO based on the read error check code REC. The serialization circuit 223 extracts the read data RDATA and the read valid signal RVALID from the output packet BO in synchronization with the buffer read clock signal BRCK/B and provides the serialized read data RDATA to the transmission driver 212-1 and provides the read valid signal RVALID to the transmission driver 212-2. The serialization circuit 223 generates the transmission read clock signals RCK-t and RCK-c from the buffer read clock signal BRCK/B and provides the transmission read clock signals RCK-t and RCK-c to the transmission drivers 212-3 and 212-4, respectively. The transmission drivers 212-1, 212-2, 212-3, 212-4 may transmit the read data RDATA, the read valid signal RVALID, and the transmission read clock signals RCK-t and RCK-c to an external device.

Figure 9:
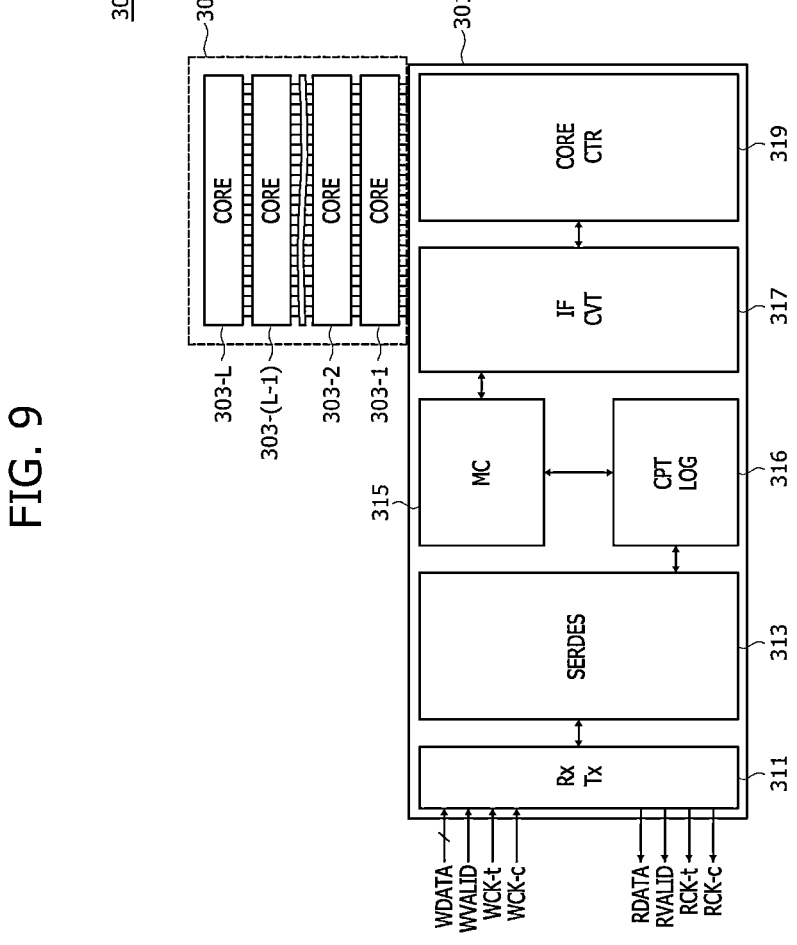
FIG. 9 is a block diagram illustrating a stack memory device according to a further embodiment of the present disclosure.

FIG. 9 is a block diagram illustrating a stack memory device 30 according to a further embodiment of the present disclosure. As shown in FIG. 9, the stack memory device 30 includes a base chip 301 and a core chip 303. The core chip 303 may be disposed on, with, or over the base chip 301. The core chip 303 may include a plurality (L) of core chips 303-1 through 303-L. Each of the plurality of core chips 303-1 through 303-L may be connected to each other through one or more through-vias (for example, 441 in FIG. 10), and may be disposed in a stacked form. The core chip 303 may receive various signals from and exchange data with the base chip 301 through the one or more through-vias.

The base chip 301 includes a transmission/reception circuit (Rx Tx) 311, a serialization/parallelization circuit (SERDES) 313, a memory controller (MC) 315, a calculation circuit (CPT LOG) 316, an interface converting circuit (IF CVT) 317, and a core control circuit (CORE CTR) 319.

The calculation circuit 316 is electrically connected to the serialization/parallelization circuit 313 and the memory controller 315 and performs calculation operations of the serialization/parallelization circuit 313 and calculation operations of the memory controller 315. The stack memory device 30 shown in FIG. 9 may be implemented in the same way as the stack memory device 20 shown in FIG. 7, except for the calculation circuit 316. Accordingly, the transmission/reception circuit 311, the serialization/parallelization circuit 313, the memory controller 315, the interface converting circuit 317, and the core control circuit 319 may be implemented in the same way as the transmission/reception circuit 211, the serialization/parallelization circuit 213, the memory controller 215, the interface converting circuit 217, and the core control circuit 219, respectively, as previously described with reference to FIG. 7.

Figure 10:
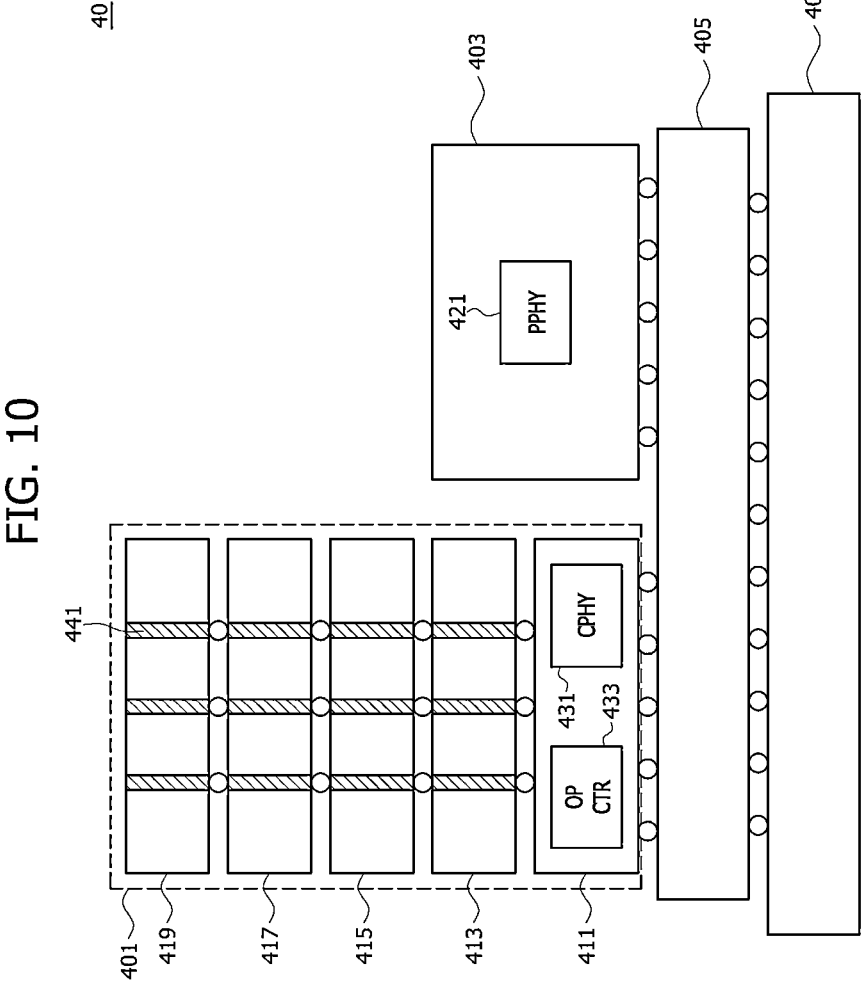
FIG. 10 is a block diagram illustrating a stack memory system according to an embodiment of the present disclosure.

FIG. 10 is a block diagram illustrating a stack memory system 40 according to an embodiment of the present disclosure. As shown in FIG. 10, the stack memory system 40 includes a stack memory device 401, a processor 403, an interposer 405, and a substrate 407.

The interposer 405 may be disposed on, with, or over the substrate 407, and the stack memory device 401 and the processor 403 may be disposed on, with, or over the interposer 405. The interposer 405 may electrically connect the substrate 407, the stack memory device 401, and the processor 403 to each other. The pitch differences between the substrate 407, the stack memory device 401, and the processor 403 are large, such that the substrate 407, the stack memory device 401, and the processor 403 may be electrically connected to each other using the interposer 405 that contains variously formed wires or other electrically conductive connection devices.

The processor 403 includes a processor interface circuit (PPHY) 421. The processor 403 provides write control signals containing commands for controlling various internal operations of the stack memory device 401 and addresses to the stack memory device 401 through the processor interface circuit 421 and receives read control signals from the stack memory device 401 through the processor interface circuit 421. The write control signals may include write data WDATA, a write valid signal WVALID, and transmission write clock signals WCK-t and WCK-c, such as shown in FIG. 1, FIG. 7, and FIG. 9. The read control signals may include read data RDATA, a read valid signal RVALID, and transmission read clock signals RCK-t and RCK-c, such as shown in FIG. 1, FIG. 7, and FIG. 9.

The stack memory device 401 includes a base chip 411 and core chips 414, 415, 417, and 419. The stack memory device 401 may be implemented similar to the stack memory device 10 shown in FIG. 1, the stack memory device 20 shown in FIG. 7, and/or the stack memory device 30 shown in FIG. 9.

The core chips 414, 415, 417, and 419 may be sequentially stacked on, with, or over the base chip 411 and receive various signals from the base chip 411 through one or more through-vias 441.

The base chip 411 includes a core interface circuit (CPHY) 431 and an operation control circuit (OP CTR) 433. The core interface circuit 431 enables communication with the processor interface circuit 421 to transmit the write control signals transmitted from the processor 403 to the operation control circuit 433 and provides the read control signals generated by the operation control circuit 433 to the processor 403. The core interface circuit 431 may be implemented with the transmission/reception circuit 111, the serialization/parallelization circuit 113, and the data transmission control circuit 115 shown in FIG. 1, the transmission/reception circuit 211 and the serialization/parallelization circuit 213 shown in FIG. 7, and/or the transmission/reception circuit 311 and the serialization/parallelization circuit 313 shown in FIG. 9. The operation control circuit 433 may be implemented with the core control circuit 119 shown in FIG. 1, the memory controller 215, the interface converting circuit 217, and the core control circuit 219 shown in FIG. 7, and/or the memory controller 315, the calculation circuit 316, the interface converting circuit 317, and the core control circuit 319 shown in FIG. 9.

Figure 11:
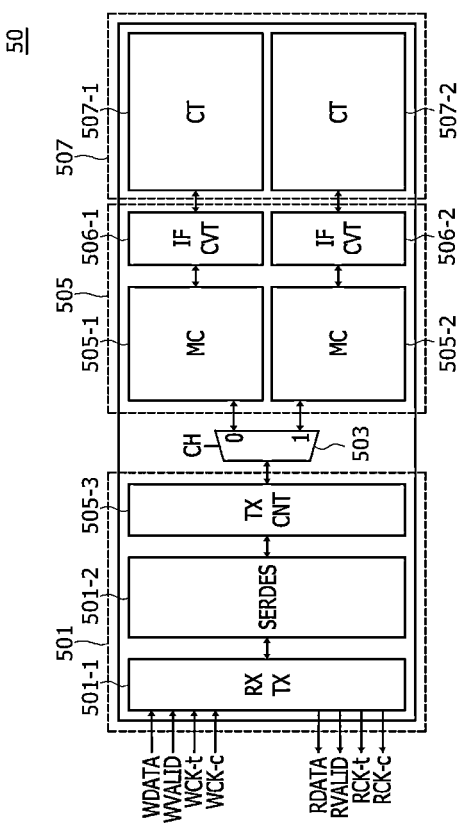
FIG. 11 is a block diagram illustrating an embodiment of a base chip included in the stack memory device.

FIG. 11 is a block diagram illustrating an embodiment of a base chip 50 included in the stack memory device. As shown in FIG. 11, the base chip 50 includes a physical layer 501, a selector 503, a control layer 505, and a transmission layer 507.

The physical layer 501 receives write data WDATA, a write valid signal WVALID, and transmission write clock signals WCK-t and WCK-c for a write operation and a read operation on the core chip (103 in FIG. 1) from an external device and transmits read data RDATA, a read valid signal RVALID, and transmission read clock signals RCK-t and RCK-C to the external device. The physical layer 501 includes a transmission/reception circuit (Tx Rx) 501-1, a serialization/parallelization circuit (SERDES) 501-2, and a data transmission control circuit (DATA TR CTR) 501-3. The transmission/reception circuit 501-1 may be implemented in the same manner as the transmission/reception circuit 111 shown in FIG. 1 or the transmission/reception circuit 211 shown in FIG. 7, so that descriptions of the specific configurations and operations may be omitted. The serialization/parallelization circuit 501-2 may be implemented in the same way as the serialization/parallelization circuit 113 shown in FIG. 1 or the serialization/parallelization circuit 213 shown in FIG. 7, so that descriptions of the specific configurations and operations may be omitted. The data transmission control circuit 501-3 may be implemented in the same way as the data transmission control circuit 115 shown in FIG. 1, so that descriptions of the specific configurations and operations may be omitted.

The selector 503 is electrically connected to the physical layer 501 and the control layer 505. The selector 503 transmits the signal output from the physical layer 501 to the control layer 505 and transmits the signal output from the control layer 505 to the physical layer 501. Each of the signal output from the physical layer 501 and the signal output from the control layer 505 may be implemented as a control signal, data, or a packet. The selector 503 transmits the signal output from the physical layer 501, based on a channel selection signal CH through a first channel or transmit the signal to the control layer 505 through a second channel. The selector 503 transmits the signal output from the physical layer 501 to the control layer 505 through the first channel when the first channel is selected by the channel selection signal CH set to binary bit "0", and transmits the signal output from the physical layer 501 to the control layer 505 through the second channel when the second channel is selected by the channel selection signal CH set to binary bit "1". The selector 503 transmits the signal output from the control layer 505 to the physical layer 501 through the first channel or transmits the signal to the physical layer 501 through the second channel, based on the channel selection signal CH. The selector 503 receives the signal output from the control layer 505 through the first channel to transmit the signal to the physical layer 501 when the first channel is selected by the channel selection signal CH set to binary bit "0", and receives the signal output from the second memory control group of the control layer 505 through the second channel to transmit the signal to the physical layer 501 when the second channel is selected by the channel selection signal CH set to binary bit "1".

The control layer 505 is electrically connected to the selector 503 and the transmission layer 507. The control layer 505 includes a first memory controller (MC) 505-1, a second memory controller 505-2, a first interface converting circuit (IF CVT) 506-1, and a second interface converting circuit 506-2. The first memory controller 505-1 and the first interface converting circuit 506-1 to which a signal is transmitted through the first channel are included in the control layer 505, and the second memory controller 505-2 and the second interface converting circuit 506-2 to which a signal is transmitted through the second channel are included in the control layer 505. The first memory controller 505-1 and the first interface converting circuit 506-1 are defined as a first memory control group, and the second memory controller 505-2 and second interface converting circuit 506-2 are defined as a second memory control group. When the first channel is selected by the channel selection signal CH, the first memory control group of the control layer 505 receives the signal output from the physical layer 501 through the first channel from the selector 503 and transmits the signal generated based on the signal output from the physical layer 501 to the transmission layer 507 through the first channel. When the first channel is selected by the channel selection signal CH, the first memory control group of the control layer 505 receives the signal output from the transmission layer 507 through the first channel and transmits the signal generated based on the signal output from the transmission layer to the selector 503 through the first channel. When the second channel is selected by the channel selection signal CH, the second memory control group of the control layer 505 receives the signal output from the physical layer 501 through the second channel from the selector and transmits the signal generated based on the signal output from the physical layer 501 to the transmission layer 507 through the second channel. When the second channel is selected by the channel selection signal CH, the second memory control group of the control layer 505 receives the signal output from the transmission layer 507 through the second channel and transmits the signal generated based on the signal output from the transmission layer to the selector 503 through the second channel.

The transmission layer 507 is electrically connected to the control layer 505. The transmission layer 507 includes a first core control circuit (CT) 507-1 and a second core control circuit (CT) 507-2. Each of the first core control circuit 507-1 and the second core control circuit 507-2 may be implemented identically to the core control circuit 119 shown in FIG. 1 or the core control circuit 219 shown in FIG. 7. Therefore, description of specific configuration and operation can be omitted. The transmission layer 507 includes the first core control circuit 507-1 to which the signal is transmitted through the first channel and the second core control circuit 507-2 to which the signal is transmitted through the second channel. The first core control circuit 507-1 receives a signal output from the first memory control group of the control layer 505 and transmits the signal generated based on the signal output from the first memory control group of the control layer 505 to the core chip. When the first channel is selected by the channel selection signal CH, the first core control circuit 507-1 receives internal data output from the core chip through the first channel and transmits the signal generated through the internal data to the first memory control group of the control layer 505 through the first channel. When the second channel is selected by the channel selection signal CH, the second core control circuit 507-2 receives the signal output from the second memory control group of the control layer 505 and transmits the signal generated based on the signal output from the second memory control group of the control layer 505 to the core chip. When the first channel is selected by the channel selection signal CH, the second core control circuit 507-2 receives the internal data output from the core chip through the first channel and transmits the signal generated through the internal data to the second memory control group of the control layer 505 through the first channel.

Depending on an embodiment, each channel may be connected to a separate core chip. For example, the first channel may be connected to the first core chip, and the second channel may be connected to the second core chip. The first core chip and the second core chip may be implemented with different types of memory devices depending on the embodiments.

As described above, in an embodiment, the base chip 50 allows one physical layer 501 to be selectively connected to a plurality of channels through the selector 503, thereby reducing the number of physical layers 501 and reducing the layout area. Accordingly, in an embodiment, the area efficiency of the stack memory device using the base chip 50 can be improved.

Figure 12:
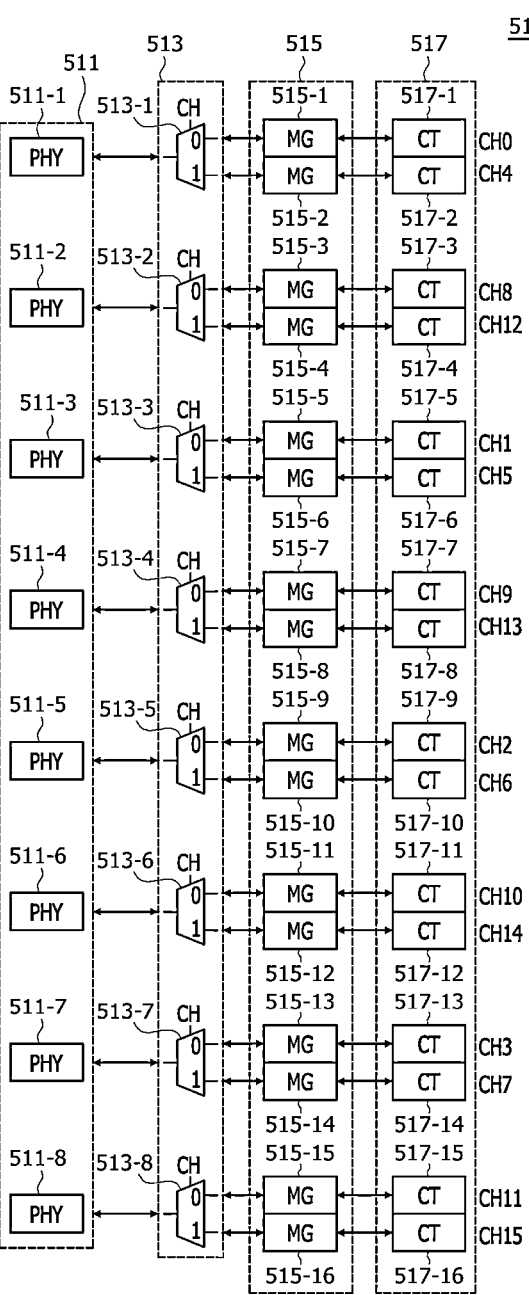
FIG. 12 is a block diagram illustrating an embodiment of a base chip included in the stack memory device.

FIG. 12 is a block diagram illustrating an embodiment of a base chip 51 included in the stack memory device. As shown in FIG. 12, the base chip 51 includes a physical layer 511, a selection circuit 513, a control layer 515, and a transmission layer 517.

The physical layer 511 includes first through eighth physical layers (PHY) 511-1 through 511-8. Each of the first through eighth physical layers 511-1 through 511-8 included in the physical layer 511 is electrically connected to the selection circuit 513.

The selection circuit 513 includes first through eighth selectors 513-1 through 513-8.

The first selector 513-1 is electrically connected to the first physical layer 511-1 and the control layer 515. The first selector 513-1 transmits the signal output from the first physical layer 511-1 to the control layer 515 and transmits the signal output from the control layer 515 to the first physical layer 511-1. Each of the signal output from the first physical layer 511-1 and the signal output from the control layer 515 may be implemented as one of a control signal, data, and a packet. The first selector 513-1 transmits the signal output from the first physical layer 511-1 to the control layer 515 through the first channel CH0, based on the channel selection signal CH or transmits the signal output from the first physical layer 511-1 to the control layer 515 through a fifth channel CH4. The first selector 513-1 transmits the signal output from the first physical layer 511-1 to the control layer 515 through the first channel CH0 when the first channel CH0 is selected by the channel selection signal CH set to binary bit "0" and transmits the signal output from the first physical layer 511-1 to the control layer 515 through the fifth channel CH4 when the fifth channel CH4 is selected by the channel selection signal CH set to binary bit "1". The first selector 513-1 transmits the signal output from the control layer 515 to the first physical layer 511-1 through the first channel CH0 to transmit the signal output from the control layer 515 to the first physical layer 511-1 through the fifth channel CH4, based on the channel selection signal CH. The first selector 513-1 receives the signal output from the control layer 515 through the first channel CH0 or transmits the signal to the first physical layer 511-1 when the first channel CH0 is selected by the channel selection signal CH set to binary bit "0" and receives the signal output from the control layer 515 through the fifth channel CH4 to transmit the signal to the first physical layer 511-1 when the fifth channel CH4 is selected by the channel selection signal CH set to binary bit "1".

The second selector 513-2 is electrically connected to the second physical layer 511-2 and the control layer 515. The second selector 513-2 transmits the signal output from the second physical layer 511-2 to the control layer 515 and transmits the signal output from the control layer 515 to the second physical layer 511-2. Each of the signal output from the second physical layer 511-2 and the signal output from the control layer 515 may be implemented as one of a control signal, data, and a packet. The second selector 513-2 transmits the signal output from the second physical layer 511-2 to the control layer 515 through a ninth channel CH8 or transmits the signal output from the second physical layer 511-2 to the control layer 515 through a thirteenth channel CH12, based on the channel selection signal CH. The second selector 513-2 transmits the signal output from the second physical layer 511-2 to the control layer 515 through the ninth channel CH8 when the ninth channel CH8 is selected by the channel selection signal CH set to binary bit "0" and transmits the signal output from the second physical layer 511-2 to the control layer 515 through the thirteenth channel CH12 when the thirteenth channel CH12 is selected by the channel selection signal CH set to binary bit "1". The second selector 513-2 transmits the signal output from the control layer 515 to the second physical layer 511-2 through the ninth channel CH8 or transmits the signal output from the control layer 515 to the second physical layer 511-2 through the thirteenth channel CH12, based on the channel selection signal CH. The second selector 513-2 receives the signal output from the control layer 515 through the ninth channel CH8 to transmit the signal to the second physical layer 511-2 when the ninth channel CH8 is selected by the channel selection signal CH set to the binary bit "0" and receives the signal output from the control layer 515 through the thirteenth channel CH12 to transmit the signal to the second physical layer 511-2 when the thirteenth channel CH12 is selected by the channel selection signal CH set to the binary bit "1".

The third selector 513-3 is electrically connected to the third physical layer 511-3 and the control layer 515. The third selector 513-3 transmits the signal output from the third physical layer 511-3 to the control layer 515 and transmits the signal output from the control layer 515 to the third physical layer 511-3. Each of the signal output from the third physical layer 511-3 and the signal output from the control layer 515 may be implemented as one of a control signal, data, and a packet. The third selector 513-3 transmits the signal output from the third physical layer 511-3 to the control layer 515 through the second channel CH1 or transmits the signal output from the third physical layer 511-3 to the control layer 515 through a sixth channel CH5, based on the channel selection signal CH. The third selector 513-3 transmits the signal output from the third physical layer 511-3 to the control layer 515 through the second channel CH1 when the second channel CH1 is selected by the channel selection signal CH set to binary bit "0" and transmits the signal output from the third physical layer 511-3 to the control layer 515 through the sixth channel CH5 when the sixth channel CH5 is selected by the channel selection signal CH set to binary bit "1". The third selector 513-3 transmits the signal output from the control layer 515 to the third physical layer 511-3 through the second channel CH1 or transmits the signal output from the control layer 515 to the third physical layer 511-3 through the sixth channel CH5, based on the channel selection signal CH. The third selector 513-3 receives the signal output from the control layer 515 through the second channel CH1 to transmit the signal to the third physical layer 511-3 when the second channel CH1 is selected by the channel selection signal CH set to binary bit "0" and receives the signal output from the control layer 515 through the sixth channel CH5 to transmit the signal to the third physical layer 511-3 when the sixth channel CH5 is selected by the channel selection signal CH set to binary bit "1".

The fourth selector 513-4 is electrically connected to the fourth physical layer 511-4 and the control layer 515. The fourth selector 513-4 transmits the signal output from the fourth physical layer 511-4 to the control layer 515 and transmits the signal output from the control layer 515 to the fourth physical layer 511-4. Each of the signal output from the fourth physical layer 511-4 and the signal output from the control layer 515 may be implemented as one of a control signal, data, and a packet. The fourth selector 513-4 transmits the signal output from the fourth physical layer 511-4 to the control layer 515 through a tenth channel CH9 or transmits the signal output from the fourth physical layer 511-4 to the control layer 515 through a fourteenth channel CH13, based on the channel selection signal CH. The fourth selector 513-4 transmits the signal output from the fourth physical layer 511-4 to the control layer 515 through the tenth channel CH9 when the tenth channel CH9 is selected by the channel selection signal CH set to binary bit "0" and transmits the signal output from the fourth physical layer 511-4 to the control layer 515 through the fourteenth channel CH13 when the fourteenth channel CH13 is selected by the channel selection signal CH set to binary bit "1". The fourth selector 513-4 transmits the signal output from the control layer 515 to the fourth physical layer 511-4 through the tenth channel CH9 or transmits the signal output from the control layer 515 to the fourth physical layer 511-4 through the fourteenth channel CH13, based on the channel selection signal CH. The fourth selector 513-4 receives the signal output from the control layer 515 through the tenth channel CH9 to transmit the signal to the fourth physical layer 511-4 when the tenth channel CH9 is selected by the channel selection signal CH set to binary bit "0" and receives the signal output from the control layer 515 through the fourteenth channel CH13 to transmit the signal to the fourth physical layer 511-4 when the fourteenth channel CH13 is selected by the channel selection signal CH set to binary bit "1".

The fifth selector 513-5 is electrically connected to the fifth physical layer 511-5 and the control layer 515. The fifth selector 513-5 transmits the signal output from the fifth physical layer 511-5 to the control layer 515 and transmits the signal output from the control layer 515 to the fifth physical layer 511-5. Each of the signal output from the fifth physical layer 511-5 and the signal output from the control layer 515 may be implemented as one of a control signal, data, and a packet. The fifth selector 513-5 transmits the signal output from the fifth physical layer 511-5 to the control layer 515 through the third channel CH2 or transmits the signal output from the fifth physical layer 511-5 to the control layer 515 through a seventh channel CH6, based on the channel selection signal CH. The fifth selector 513-5 transmits the signal output from the fifth physical layer 511-5 to the control layer 515 through the third channel CH2 when the third channel CH2 is selected by the channel selection signal CH set to binary bit "0" and transmits the signal output from the fifth physical layer 511-5 to the control layer 515 through the seventh channel CH6 when the seventh channel CH6 is selected by the channel selection signal CH set to binary bit "1". The fifth selector 513-5 transmits the signal output from the control layer 515 to the fifth physical layer 511-5 through the third channel CH2 or transmits the signal output from the control layer 515 to the fifth physical layer 511-5 through the seventh channel CH6, based on the channel selection signal CH. The fifth selector 513-5 receives the signal output from the control layer 515 through the third channel CH2 to transmit the signal to the fifth physical layer 511-5 when the third channel CH2 is selected by the channel selection signal CH set to binary bit "0" and receives the signal output from the control layer 515 through the seventh channel CH6 to transmit the signal to the fifth physical layer 511-5 when the seventh channel CH6 is selected by the channel selection signal CH set to binary bit "1".

The sixth selector 513-6 is electrically connected to the sixth physical layer 511-6 and the control layer 515. The sixth selector 513-6 transmits the signal output from the sixth physical layer 511-6 to the control layer 515 and transmits the signal output from the control layer 515 to the sixth physical layer 511-6. Each of the signal output from the sixth physical layer 511-6 and the signal output from the control layer 515 may be implemented as one of a control signal, data, and a packet. The sixth selector 513-6 transmits the signal output from the sixth physical layer 511-6 to the control layer 515 through an eleventh channel CH10 or transmits the signal output from the sixth physical layer 511-6 to the control layer 515 through a fifteenth channel CH14, based on the channel selection signal CH. The sixth selector 513-6 transmits the signal output from the sixth physical layer 511-6 to the control layer 515 through the eleventh channel CH10 when the eleventh channel CH10 is selected by the channel selection signal CH set to binary bit "0" and transmits the signal output from the sixth physical layer 511-6 to the control layer 515 through the fifteenth channel CH14 when the fifteenth channel CH14 is selected by the channel selection signal CH set to binary bit "1". The sixth selector 513-6 transmits the signal output from the control layer 515 to the sixth physical layer 511-6 through the eleventh channel CH10 or transmits the signal output from the control layer 515 to the sixth physical layer 511-6 through the fifteenth channel CH14, based on the channel selection signal CH. The sixth selector 513-6 receives the signal output from the control layer 515 through the eleventh channel CH10 to transmit the signal to the sixth physical layer 511-6 when the eleventh channel CH10 is selected by the channel selection signal CH set to binary bit "0" and receives the signal output from the control layer 515 through the fifteenth channel CH14 to transmit the signal to the sixth physical layer 511-6 when the fifteenth channel CH14 is selected by the channel selection signal CH set to binary bit "1".

The seventh selector 513-7 is electrically connected to the seventh physical layer 511-7 and the control layer 515. The seventh selector 513-7 transmits the signal output from the seventh physical layer 511-7 to the control layer 515 and transmits the signal output from the control layer 515 to the seventh physical layer 511-7. Each of the signal output from the seventh physical layer 511-7 and the signal output from the control layer 515 may be implemented as one of a control signal, data, and a packet. The seventh selector 513-7 transmits the signal output from the seventh physical layer 511-7 to the control layer 515 through a fourth channel CH3 or transmits the signal output from the seventh physical layer 511-7 to the control layer 515 through an eighth channel CH7, based on the channel selection signal CH. The seventh selector 513-7 transmits the signal output from the seventh physical layer 511-7 to the control layer 515 through the fourth channel CH3 when the fourth channel CH3 is selected by the channel selection signal CH set to binary bit "0" and transmits the signal output from the seventh physical layer 511-7 to the control layer 515 through the eighth channel CH7 when the eighth channel CH7 is selected by the channel selection signal CH set to binary bit "1". The seventh selector 513-7 transmits the signal output from the control layer 515 to the seventh physical layer 511-7 through the fourth channel CH3 or transmits the signal output from the control layer 515 to the seventh physical layer 511-7 through the eighth channel CH7, based on the channel selection signal CH. The seventh selector 513-7 receives the signal output from the control layer 515 through the fourth channel CH3 to transmit the signal to the seventh physical layer 511-7 when the fourth channel CH3 is selected by the channel selection signal CH set to binary bit "0" and receives the signal output from the control layer 515 through the eighth channel CH7 to transmit the signal to the seventh physical layer 511-7 when the eighth channel CH7 is selected by the channel selection signal CH set to binary bit "1".

The eighth selector 513-8 is electrically connected to the eighth physical layer 511-8 and the control layer 515. The eighth selector 513-8 transmits the signal output from the eighth physical layer 511-8 to the control layer 515 and transmits the signal output from the control layer 515 to the eighth physical layer 511-8. Each of the signal output from the eighth physical layer 511-8 and the signal output from the control layer 515 may be implemented as one of a control signal, data, and a packet. The eighth selector 513-8 transmits the signal output from the eighth physical layer 511-8 to the control layer 515 through a twelfth channel CH11 or transmits the signal output from the eighth physical layer 511-8 to the control layer 515 through a sixteenth channel CH15, based on the channel selection signal CH. The eighth selector 513-8 transmits the signal output from the eighth physical layer 511-8 to the control layer 515 through the twelfth channel CH11 when the twelfth channel CH11 is selected by the channel selection signal CH set to binary bit "0" and transmits the signal output from the eighth physical layer 511-8 to the control layer 515 through the sixteenth channel CH15 when the sixteenth channel CH15 is selected by the channel selection signal CH set to binary bit "1". The eighth selector 513-8 transmits the signal output from the control layer 515 to the eighth physical layer 511-8 through the twelfth channel CH11 or transmits the signal output from the control layer 515 to the eighth physical layer 511-8 through the sixteenth channel CH15, based on the channel selection signal CH. The eighth selector 513-8 receives the signal output from the control layer 515 through the twelfth channel CH11 to transmit the signal to the eighth physical layer 511-8 when the twelfth channel CH11 is selected by the channel selection signal CH set to binary bit "0" and receives the signal output from the control layer 515 through the sixteenth channel CH15 to transmit the signal to the eighth physical layer 511-8 when the sixteenth channel CH15 is selected by the channel selection signal CH set to binary bit "1".

It is described that the first channel CH0, the ninth channel CH8, the second channel CH1, the tenth channel CH9, the third channel CH2, the eleventh channel CH10, the fourth channel CH3, and the twelfth channel CH11 are selected when the channel selection signal CH is set to binary bit "0", and the fifth channel CH4, the thirteenth channel CH12, the sixth channel CH5, the fourteenth channel CH13, the seventh channel CH6, the fifteenth channel CH14, the eighth channel CH7, and the sixteenth channel CH15 are selected when the channel selection signal CH is set to binary bit "1". However, this is only an example, and the present disclosure is not limited thereto.

The control layer 515 includes first through sixteenth memory control groups (MG) 515-1 through 515-16.

The first memory control group 515-1 is electrically connected to the first selector 513-1 and the transmission layer 517. When the first channel CH0 is selected, the first memory control group 515-1 receives the signal output from the first physical layer 511-1 through the first channel CH0 from the first selector 513-1 and transmits the signal generated based on the signal output from the first physical layer 511-1 to the transmission layer 517. When the first channel CH0 is selected, the first memory control group 515-1 receives the signal output from the transmission layer 517 through the first channel CH0 and transmits the signal generated based on the signal output from the transmission layer 517 to the first selector 513-1.

The second memory control group 515-2 is electrically connected to the first selector 513-1 and the transmission layer 517. When the fifth channel CH4 is selected, the second memory control group 515-2 receives the signal output from the first physical layer 511-1 through the fifth channel CH4 from the first selector 513-1 and transmits the signal generated based on the signal output from the first physical layer 511-1 to the transmission layer 517. When the fifth channel CH4 is selected, the second memory control group 515-2 receives the signal output from the transmission layer 517 through the fifth channel CH4 and transmits the signal generated based on the signal output from the transmission layer 517 to the first selector 513-1.

The third memory control group 515-3 is electrically connected to the second selector 513-2 and the transmission layer 517. When the ninth channel CH8 is selected, the third memory control group 515-3 receives the signal output from the second physical layer 511-2 through the ninth channel CH8 from the second selector 513-2 and transmits the signal generated based on the signal output from the second physical layer 511-2 to the transmission layer 517. When the ninth channel CH8 is selected, the third memory control group 515-3 receives the signal output from the transmission layer 517 through the ninth channel CH8 and transmits the signal generated based on the signal output from the transmission layer 517 to the second selector 513-2.

The fourth memory control group 515-4 is electrically connected to the second selector 513-2 and the transmission layer 517. When the thirteenth channel CH12 is selected, the fourth memory control group 515-4 receives the signal output from the second physical layer 511-2 through the thirteenth channel CH12 from the second selector 513-2 and transmits the signal generated based on the signal output from the second physical layer 511-2 to the transmission layer 517. When the thirteenth channel CH12 is selected, the fourth memory control group 515-4 receives the signal output from the transmission layer 517 through the thirteenth channel CH12 and transmits the signal generated based on the signal output from the transmission layer 517 to the second selector 513-2.

The fifth memory control group 515-5 is electrically connected to the third selector 513-3 and the transmission layer 517. When the second channel CH1 is selected, the fifth memory control group 515-5 receives the signal output from the third physical layer 511-3 through the second channel CH1 from the third selector 513-3 and transmits the signal generated based on the signal output from the third physical layer 511-3 to the transmission layer 517. When the second channel CH1 is selected, the fifth memory control group 515-5 receives the signal output from the transmission layer 517 through the second channel CH1 and transmits the signal generated based on the signal output from the transmission layer 517 to the third selector 513-3.

The sixth memory control group 515-6 is electrically connected to the third selector 513-3 and the transmission layer 517. When the sixth channel CH5 is selected, the sixth memory control group 515-6 receives the signal output from the third physical layer 511-3 through the sixth channel CH5 from the third selector 513-3 and transmits the signal generated based on the signal output from the third physical layer 511-3 to the transmission layer 517. When the sixth channel CH5 is selected, the sixth memory control group 515-6 receives the signal output from the transmission layer 517 through the sixth channel CH5 and transmits the signal generated based on the signal output from the transmission layer 517 to the third selector 513-3.

The seventh memory control group 515-7 is electrically connected to the fourth selector 513-4 and the transmission layer 517. When the tenth channel CH9 is selected, the seventh memory control group 515-7 receives the signal output from the fourth physical layer 511-4 through the tenth channel CH9 from the fourth selector 513-4 and transmits the signal generated based on the signal output from the fourth physical layer 511-4 to the transmission layer 517. When the tenth channel CH9 is selected, the seventh memory control group 515-7 receives the signal output from the transmission layer 517 through the tenth channel CH9 and transmits the signal generated based on the signal output from the transmission layer 517 to the fourth selector 513-4.

The eighth memory control group 515-8 is electrically connected to the fourth selector 513-4 and the transmission layer 517. When the fourteenth channel CH13 is selected, the eighth memory control group 515-8 receives the signal output from the fourth physical layer 511-4 through the fourteenth channel CH13 from the fourth selector 513-4 and transmits the signal generated based on the signal output from the fourth physical layer 511-4 to the transmission layer 517. When the fourteenth channel CH13 is selected, the eighth memory control group 515-8 receives the signal output from the transmission layer 517 through the fourteenth channel CH13 and transmits the signal generated based on the signal output from the transmission layer 517 to the fourth selector 513-4.

The ninth memory control group 515-9 is electrically connected to the fifth selector 513-5 and the transmission layer 517. When the third channel CH2 is selected, the ninth memory control group 515-9 receives the signal output from the fifth physical layer 511-5 through the third channel CH2 from the fifth selector 513-5 and transmits the signal generated based on the signal output from the fifth physical layer 511-5 to the transmission layer 517. When the third channel CH2 is selected, the ninth memory control group 515-9 receives the signal output from the transmission layer 517 through the third channel CH2 and transmits the signal generated based on the signal output from the transmission layer 517 to the fifth selector 513-5.

The tenth memory control group 515-10 is electrically connected to the fifth selector 513-5 and the transmission layer 517. When the seventh channel CH6 is selected, the tenth memory control group 515-10 receives the signal output from the fifth physical layer 511-5 through the seventh channel CH6 from the fifth selector 513-5 and transmits the signal generated based on the signal output from the fifth physical layer 511-5 to the transmission layer 517. When the seventh channel CH6 is selected, the tenth memory control group 515-10 receives the signal output from the transmission layer 517 through the seventh channel CH6 and transmits the signal generated based on the signal output from the transmission layer 517 to the fifth selector 513-5.

The eleventh memory control group 515-11 is electrically connected to the sixth selector 513-6 and the transmission layer 517. When the eleventh channel CH10 is selected, the eleventh memory control group 515-11 receives the signal output from the sixth physical layer 511-6 through the eleventh channel CH10 from the sixth selector 513-6 and transmits the signal generated based on the signal output from the sixth physical layer 511-6 to the transmission layer 517. When the eleventh channel CH10 is selected, the eleventh memory control group 515-11 receives the signal output from the transmission layer 517 through the eleventh channel CH10 and transmits the signal generated based on the signal output from the transmission layer 517 to the sixth selector 513-6.

The twelfth memory control group 515-12 is electrically connected to the sixth selector 513-6 and the transmission layer 517. When the fifteenth channel CH14 is selected, the twelfth memory control group 515-12 receives the signal output from the sixth physical layer 511-6 through the fifteenth channel CH14 from the sixth selector 513-6 and transmits the signal generated based on the signal output from the sixth physical layer 511-6 to the transmission layer 517. When the fifteenth channel CH14 is selected, the twelfth memory control group 515-12 receives the signal output from the transmission layer 517 through the fifteenth channel CH14 and transmits the signal generated based on the signal output from the transmission layer 517 to the sixth selector 513-6.

The thirteenth memory control group 515-13 is electrically connected to the seventh selector 513-7 and the transmission layer 517. When the fourth channel CH3 is selected, the thirteenth memory control group 515-13 receives the signal output from the seventh physical layer 511-7 through the fourth channel CH3 from the seventh selector 513-7 and transmits the signal generated based on the signal output from the seventh physical layer 511-7 to the transmission layer 517. When the fourth channel CH3 is selected, the thirteenth memory control group 515-13 receives the signal output from the transmission layer 517 through the fourth channel CH3 and transmits the signal generated based on the signal output from the transmission layer 517 to the seventh selector 513-7.

The fourteenth memory control group 515-14 is electrically connected to the seventh selector 513-7 and the transmission layer 517. When the eighth channel CH7 is selected, the fourteenth memory control group 515-14 receives the signal output from the seventh physical layer 511-7 through the eighth channel CH7 from the seventh selector 513-7 and transmits the signal generated based on the signal output from the seventh physical layer 511-7 to the transmission layer 517. When the eighth channel CH7 is selected, the fourteenth memory control group 515-14 receives the signal output from the transmission layer 517 through the eighth channel CH7 and transmits the signal generated based on the signal output from the transmission layer 517 to the seventh selector 513-7.

The fifteenth memory control group 515-15 is electrically connected to the eighth selector 513-8 and the transmission layer 517. When the twelfth channel CH11 is selected, the fifteenth memory control group 515-15 receives the signal output from the eighth physical layer 511-8 through the twelfth channel CH11 from the eighth selector 513-8 and transmits the signal generated based on the signal output from the eighth physical layer 511-8 to the transmission layer 517. When the twelfth channel CH11 is selected, the fifteenth memory control group 515-15 receives the signal output from the transmission layer 517 through the twelfth channel CH11 and transmits the signal generated based on the signal output from the transmission layer 517 to the eighth selector 513-8.

The sixteenth memory control group 515-16 is electrically connected to the eighth selector 513-8 and the transmission layer 517. When the sixteenth channel CH15 is selected, the sixteenth memory control group 515-16 receives the signal output from the eighth physical layer 511-8 through the sixteenth channel CH15 from the eighth selector 513-8 and transmits the signal generated based on the signal output from the eighth physical layer 511-8 to the transmission layer 517. When the sixteenth channel CH15 is selected, the sixteenth memory control group 515-16 receives the signal output from the transmission layer 517 through the sixteenth channel CH15 and transmits the signal generated based on the signal output from the transmission layer 517 to the eighth selector 513-8.

The transmission layer 517 includes first through sixteenth core control circuits (CT) 517-1 through 517-16.

The first core control circuit 517-1 is electrically connected to the first memory control group 515-1. When the first channel CH0 is selected, the first core control circuit 517-1 receives the signal output from the first memory control group 515-1 through the first channel CH0 and transmits the signal generated based on the signal output from the first memory control group 515-1 to the core chip through the first channel CH0. When the first channel CH0 is selected, the first core control circuit 517-1 receives the internal data output from the core chip through the first channel CH0 and transmits the signal generated based on the internal data to the first memory control group 515-1 through the first channel CH0.

The second core control circuit 517-2 is electrically connected to the second memory control group 515-2. When the fifth channel CH4 is selected, the second core control circuit 517-2 receives the signal output from the second memory control group 515-2 through the fifth channel CH4 and transmits the signal generated based on the signal output from the second memory control group 515-2 to the core chip through the fifth channel CH4. When the fifth channel CH4 is selected, the second core control circuit 517-2 receives the internal data output from the core chip through the fifth channel CH4 and transmits the signal generated based on the internal data to the second memory control group 515-2 through the fifth channel CH4.

The third core control circuit 517-3 is electrically connected to the third memory control group 515-3. When the ninth channel CH8 is selected, the third core control circuit 517-3 receives the signal output from the third memory control group 515-3 through the ninth channel CH8 and transmits the signal generated based on the signal output from the third memory control group 515-3 to the core chip through the ninth channel CH8. When the ninth channel CH8 is selected, the third core control circuit 517-3 receives the internal data output from the core chip through the ninth channel CH8 and transmits the signal generated based on the internal data to the third memory control group 515-3 through the ninth channel CH8.

The fourth core control circuit 517-4 is electrically connected to the fourth memory control group 515-4. When the thirteenth channel CH12 is selected, the fourth core control circuit 517-4 receives the signal output from the fourth memory control group 515-4 through the thirteenth channel CH12 and transmits the signal generated based on the signal output from the fourth memory control group 515-4 to the core chip through the thirteenth channel CH12. When the thirteenth channel CH12 is selected, the fourth core control circuit 517-4 receives the internal data output from the core chip through the thirteenth channel CH12 and transmits the signal generated based on the internal data to the fourth memory control group 515-4 through the thirteenth channel CH12.

The fifth core control circuit 517-5 is electrically connected to the fifth memory control group 515-5. When the second channel CH1 is selected, the fifth core control circuit 517-5 receives the signal output from the fifth memory control group 515-5 through the second channel CH1 and transmits the signal generated based on the signal output from the fifth memory control group 515-5 to the core chip through the second channel CH1. When the second channel CH1 is selected, the fifth core control circuit 517-5 receives the internal data output from the core chip through the second channel CH1 and transmits the signal generated based on the internal data to the fifth memory control group 515-5 through the second channel CH1.

The sixth core control circuit 517-6 is electrically connected to the sixth memory control group 515-6. When the sixth channel CH5 is selected, the sixth core control circuit 517-6 receives the signal output from the sixth memory control group 515-6 through the sixth channel CH5 and transmits the signal generated based on the signal output from the sixth memory control group 515-6 to the core chip through the sixth channel CH5. When the sixth channel CH5 is selected, the sixth core control circuit 517-6 receives the internal data output from the core chip through the sixth channel CH5 and transmits the signal generated based on the internal data to the sixth memory control group 515-6 through the sixth channel CH5.

The seventh core control circuit 517-7 is electrically connected to the seventh memory control group 515-7. When the tenth channel CH9 is selected, the seventh core control circuit 517-7 receives the signal output from the seventh memory control group 515-7 through the tenth channel CH9 and transmits the signal generated based on the signal output from the seventh memory control group 515-7 to the core chip through the tenth channel CH9. When the tenth channel CH9 is selected, the seventh core control circuit 517-7 receives the internal data output from the core chip through the tenth channel CH9 and transmits the signal generated based on the internal data to the seventh memory control group 515-7 through the tenth channel CH9.

The eighth core control circuit 517-8 is electrically connected to the eighth memory control group 515-8. When the fourteenth channel CH13 is selected, the eighth core control circuit 517-8 receives the signal output from the eighth memory control group 515-8 through the fourteenth channel CH13 and transmits the signal generated based on the signal output from the eighth memory control group 515-8 to the core chip through the fourteenth channel CH13. When the fourteenth channel CH13 is selected, the eighth core control circuit 517-8 receives the internal data output from the core chip through the fourteenth channel CH13 and transmits the signal generated based on the internal data to the eighth memory control group 515-8 through the fourteenth channel CH13.

The ninth core control circuit 517-9 is electrically connected to the ninth memory control group 515-9. When the third channel CH2 is selected, the ninth core control circuit 517-9 receives the signal output from the ninth memory control group 515-9 through the third channel CH2 and transmits the signal generated based on the signal output from the ninth memory control group 515-9 to the core chip through the third channel CH2. When the third channel CH2 is selected, the ninth core control circuit 517-9 receives the internal data output from the core chip through the third channel CH2 and transmits the signal generated based on the internal data to the ninth memory control group 515-9 through the third channel CH2.

The tenth core control circuit 517-10 is electrically connected to the tenth memory control group 515-10. When the seventh channel CH6 is selected, the tenth core control circuit 517-10 receives the signal output from the tenth memory control group 515-10 through the seventh channel CH6 and transmits the signal generated based on the signal output from the tenth memory control group 515-10 to the core chip through the seventh channel CH6. When the seventh channel CH6 is selected, the tenth core control circuit 517-10 receives the internal data output from the core chip through the seventh channel CH6 and transmits the signal generated based on the internal data to the tenth memory control group 515-10 through the seventh channel CH6.

The eleventh core control circuit 517-11 is electrically connected to the eleventh memory control group 515-11. When the eleventh channel CH10 is selected, the eleventh core control circuit 517-11 receives the signal output from the eleventh memory control group 515-11 through the eleventh channel CH10 and transmits the signal generated based on the signal output from the eleventh memory control group 515-11 to the core chip through the eleventh channel CH10. When the eleventh channel CH10 is selected, the eleventh core control circuit 517-11 receives the internal data output from the core chip through the eleventh channel CH10 and transmits the signal generated based on the internal data to the eleventh memory control group 515-11 through the eleventh channel CH10.

The twelfth core control circuit 517-12 is electrically connected to the twelfth memory control group 515-12. When the fifteenth channel CH14 is selected, the twelfth core control circuit 517-12 receives the signal output from the twelfth memory control group 515-12 through the fifteenth channel CH14 and transmits the signal generated based on the signal output from the twelfth memory control group 515-12 to the core chip through the fifteenth channel CH14. When the fifteenth channel CH14 is selected, the twelfth core control circuit 517-12 receives the internal data output from the core chip through the fifteenth channel CH14 and transmits the signal generated based on the internal data to the twelfth memory control group 515-12 through the fifteenth channel CH14.

The thirteenth core control circuit 517-13 is electrically connected to the thirteenth memory control group 515-13. When the fourth channel CH3 is selected, the thirteenth core control circuit 517-13 receives the signal output from the thirteenth memory control group 515-13 through the fourth channel CH3 and transmits the signal generated based on the signal output from the thirteenth memory control group 515-13 to the core chip through the fourth channel CH3. When the fourth channel CH3 is selected, the thirteenth core control circuit 517-13 receives the internal data output from the core chip through the fourth channel CH3 and transmits the signal generated based on the internal data to the thirteenth memory control group 515-13 through the fourth channel CH3.

The fourteenth core control circuit 517-14 is electrically connected to the fourteenth memory control group 515-14. When the eighth channel CH7 is selected, the fourteenth core control circuit 517-14 receives the signal output from the fourteenth memory control group 515-14 through the eighth channel CH7 and transmits the signal generated based on the signal output from the fourteenth memory control group 515-14 to the core chip through the eighth channel CH7. When the eighth channel CH7 is selected, the fourteenth core control circuit 517-14 receives the internal data output from the core chip through the eighth channel CH7 and transmits the signal generated based on the internal data to the fourteenth memory control group 515-14 through the eighth channel CH7.

The fifteenth core control circuit 517-15 is electrically connected to the fifteenth memory control group 515-15. When the twelfth channel CH11 is selected, the fifteenth core control circuit 517-15 receives the signal output from the fifteenth memory control group 515-15 through the twelfth channel CH11 and transmits the signal generated based on the signal output from the fifteenth memory control group 515-15 to the core chip through the twelfth channel CH11. When the twelfth channel CH11 is selected, the fifteenth core control circuit 517-15 receives the internal data output from the core chip through the twelfth channel CH11 and transmits the signal generated based on the internal data to the fifteenth memory control group 515-15 through the twelfth channel CH11.

The sixteenth core control circuit 517-16 is electrically connected to the sixteenth memory control group 515-16. When the sixteenth channel CH15 is selected, the sixteenth core control circuit 517-16 receives the signal output from the sixteenth memory control group 515-16 through the sixteenth channel CH15 and transmits the signal generated based on the signal output from the sixteenth memory control group 515-16 to the core chip through the sixteenth channel CH15. When the sixteenth channel CH15 is selected, the sixteenth core control circuit 517-16 receives the internal data output from the core chip through the sixteenth channel CH15 and transmits the signal generated based on the internal data to the sixteenth memory control group 515-16 through the sixteenth channel CH15.

As described above in the various embodiments, the base chip 51 allows each of the first through eighth physical layers (PHY) 511-1 through 511-8 included in the physical layer 511 to be selectively connected to the plurality of channels CH0 through CH15 through the first through eighth selectors 513-1 through 513-8 included in the selection circuit 513, thereby reducing the number of first through eighth physical layers (PHY) 511-1 through 511-8 included in the physical layer 511 and reducing the layout area. Accordingly, in an embodiment, the area efficiency of the stack memory device using the base chip 51 can be improved.

Depending on the embodiment, each of the first through sixteenth channels CH0 through CH15 may be connected to a separate core chip. For example, the first channel CH0 may be connected to the first core chip, and the second channel CH1 may be connected to the second core chip. In the same manner, the sixteenth channel CH15 may be connected to the sixteenth core chip. Each of the first through sixteenth core chips may be implemented with different types of memory depending on the embodiment.

FIG. 13 is a block diagram illustrating an embodiment of a base chip 53 included in the stack memory device. As shown in FIG. 13, the base chip 53 includes first through eighth physical layer (PHY) 511-1 through 511-8, first through sixteenth memory controllers (MC) 535-1 through 535-16, and first through sixteenth channels CH0 through CH15.

The first physical layer 531-1 is shared by the first memory controller 535-1 and the second memory controller 535-2. The first memory controller 535-1 receives or transmits a signal through the first channel CH0. The second memory controller 535-2 receives or transmits a signal through the fifth channel CH4.

The second physical layer 531-2 is shared by the third memory controller 535-3 and the fourth memory controller 535-4. The third memory controller 535-3 receives or transmits a signal through the ninth channel CH8. The fourth memory controller 535-4 receives or transmits a signal through the thirteenth channel CH12.

The third physical layer 531-3 is shared by the fifth memory controller 535-5 and the sixth memory controller 535-6. The fifth memory controller 535-5 receives or transmits a signal through the second channel CH1. The sixth memory controller 535-6 receives or transmits a signal through the sixth channel CH5.

The fourth physical layer 531-4 is shared by the seventh memory controller 535-7 and the eighth memory controller 535-8. The seventh memory controller 535-7 receives or transmits a signal through the third channel CH2. The eighth memory controller 535-8 receives or transmits a signal through the seventh channel CH6.

The fifth physical layer 531-5 is shared by the ninth memory controller 535-9 and the tenth memory controller 535-10. The ninth memory controller 535-9 receives or transmits a signal through the third channel CH2. The tenth memory controller 535-10 receives or transmits a signal through the seventh channel CH6.

The sixth physical layer 531-6 is shared by the eleventh memory controller 535-11 and the twelfth memory controller 535-12. The eleventh memory controller 535-11 receives or transmits a signal through the eleventh channel CH10. The twelfth memory controller 535-12 receives or transmits a signal through the fifteenth channel CH14.

The seventh physical layer 531-7 is shared by the thirteenth memory controller 535-13 and the fourteenth memory controller 535-14. The thirteenth memory controller 535-13 receives or transmits a signal through the fourth channel CH3. The fourteenth memory controller 535-14 receives or transmits a signal through the eighth channel CH7.

The eighth physical layer 531-8 is shared by the fifteenth memory controller 535-15 and the sixteenth memory controller 535-16. The fifteenth memory controller 535-15 receives or transmits a signal through the twelfth channel CH11. The sixteenth memory controller 535-16 receives or transmits a signal through the sixteenth channel CH15.

Figure 14:
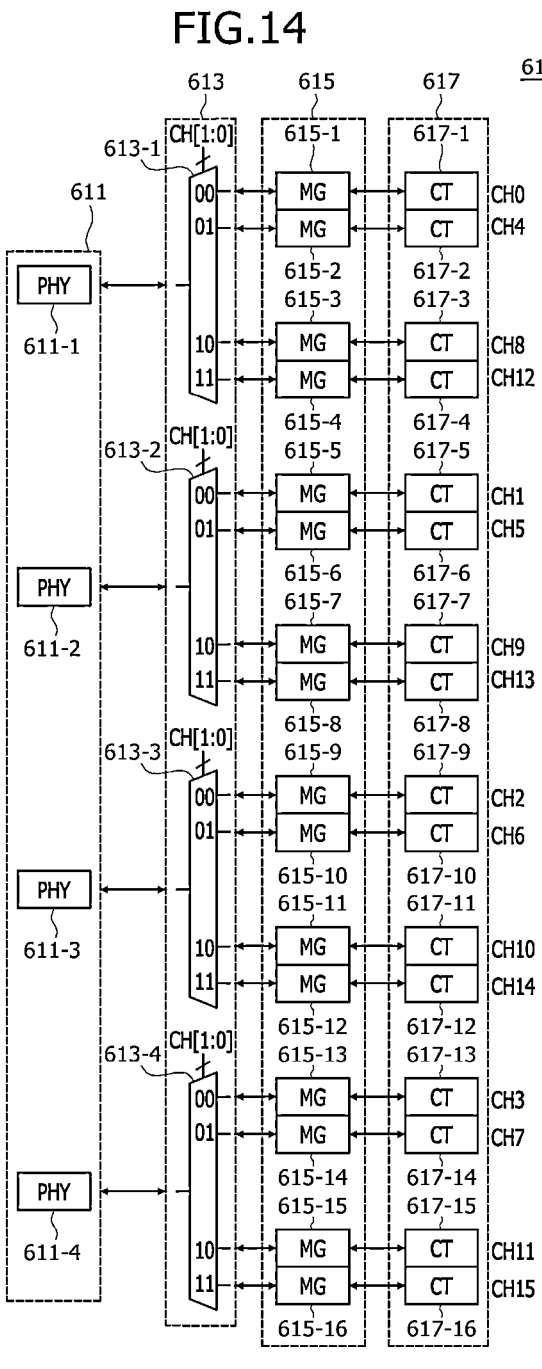
FIG. 14 is a block diagram illustrating an embodiment of a base chip included in the stack memory device.

FIG. 14 is a block diagram illustrating an embodiment of a base chip 61 included in the stack memory device. As shown in FIG. 14, the base chip 61 includes a physical layer 611, a selection circuit 613, a control layer 615, and a transmission layer 617.

The physical layer 611 includes first through fourth physical layers (PHY) 611-1 through 611-4. Each of the first through fourth physical layers 611-1 through 611-4 is electrically connected to the selection circuit 613.

The selection circuit 613 includes first through fourth selectors 613-1 through 613-4.

The first selector 613-1 is electrically connected to the first physical layer 611-1 and the control layer 615. The first selector 613-1 transmits the signal output from the first physical layer 611-1 to the control layer 615 and transmits the signal output from the control layer 615 to the first physical layer 611-1. Each of the signal output from the first physical layer 611-1 and the signal output from the control layer 615 may be implemented as one of a control signal, data, and a packet. The first selector 613-1 transmits the signal output from the first physical layer 611-1 to the control layer 615 through one of the first channel CH0, the fifth channel CH4, the ninth channel CH8, and the thirteenth channel CH12, based on a channel selection signal CH[1:0]. The first selector 613-1 transmits the signal output from the first physical layer 611-1 to the control layer 615 through the first channel CH0 when the first channel CH0 is selected by the channel selection signal CH[1:0] set to binary bit set "00", transmits the signal output from the first physical layer 611-1 to the control layer 615 through the fifth channel CH4 when the fifth channel CH4 is selected by the channel selection signal CH[1:0] set to binary bit set "01", transmits the signal output from the first physical layer 611-1 to the control layer 615 through the ninth channel CH8 when the ninth channel CH8 is selected by the channel selection signal CH[1:0] set to binary bit set "10", and transmits the signal output from the first physical layer 611-1 to the control layer 615 through the thirteenth channel CH12 when the thirteenth channel CH12 is selected by the channel selection signal CH[1:0] set to binary bit set "11". The first selector 613-1 transmits the signal output from the control layer 615 to the first physical layer 611-1 through one of the first channel CH0, the fifth channel CH4, the ninth channel CH8, and the thirteenth channel CH12, based on the channel selection signals CH[1:0]. The first selector 613-1 transmits the signal output from the control layer 615 to the first physical layer 611-1 through the first channel CH0 when the first channel CH0 is selected by the channel selection signal CH[1:0] set to binary bit set "00", transmits the signal output from the control layer 615 to the first physical layer 611-1 through the fifth channel CH4 when the fifth channel CH4 is selected by the channel selection signal CH[1:0] set to binary bit set "01", transmits the signal output from the control layer 615 to the first physical layer 611-1 through the ninth channel CH8 when the ninth channel CH8 is selected by the channel selection signal CH[1:0] set to binary bit set "10", and transmits the signal output from the control layer 615 to the first physical layer 611-1 through the thirteenth channel CH12 when the thirteenth channel CH12 is selected by the channel selection signal CH[1:0] set to binary bit set "11".

The second selector 613-2 is electrically connected to the second physical layer 611-2 and the control layer 615. The second selector 613-2 transmits the signal output from the second physical layer 611-2 to the control layer 615 and transmits the signal output from the control layer 615 to the second physical layer 611-2. Each of the signal output from the second physical layer 611-2 and the signal output from the control layer 615 may be implemented as one of a control signal, data, and a packet. The second selector 613-2 transmits the signal output from the second physical layer 611-2 to the control layer 615 through one of the second channel CH1, the sixth channel CH5, the tenth channel CH9, and the fourteenth channel CH13, based on the channel selection signal CH[1:0]. The second selector 613-2 transmits the signal output from the second physical layer 611-2 to the control layer 615 through the second channel CH1 when the second channel CH1 is selected by the channel selection signal CH[1:0] set to binary bit set "00", transmits the signal output from the second physical layer 611-2 to the control layer 615 through the sixth channel CH5 when the sixth channel CH5 is selected by the channel selection signal CH[1:0] set to binary bit set "01", transmits the signal output from the second physical layer 611-2 to the control layer 615 through the tenth channel CH9 when the tenth channel CH9 is selected by the channel selection signal CH[1:0] set to binary bit set "10", and transmits the signal output from the second physical layer 611-2 to the control layer 615 through the fourteenth channel CH13 when the fourteenth channel CH13 is selected by the channel selection signal CH[1:0] set to binary bit set "11". The second selector 613-2 transmits the signal output from the control layer 615 to the second physical layer 611-2 through one of the second channel CH1, the sixth channel CH5, the tenth channel CH9, and the fourteenth channel CH13, based on the channel selection signals CH[1:0]. The second selector 613-2 transmits the signal output from the control layer 615 to the second physical layer 611-2 through the second channel CH1 when the second channel CH1 is selected by the channel selection signal CH[1:0] set to binary bit set "00", transmits the signal output from the control layer 615 to the second physical layer 611-2 through the sixth channel CH5 when the sixth channel CH5 is selected by the channel selection signal CH[1:0] set to binary bit set "01", transmits the signal output from the control layer 615 to the second physical layer 611-2 through the tenth channel CH9 when the tenth channel CH9 is selected by the channel selection signal CH[1:0] set to binary bit set "10", and transmits the signal output from the control layer 615 to the second physical layer 611-2 through the fourteenth channel CH13 when the fourteenth channel CH13 is selected by the channel selection signal CH[1:0] set to binary bit set "11".

The third selector 613-3 is electrically connected to the third physical layer 611-3 and the control layer 615. The third selector 613-3 transmits the signal output from the third physical layer 611-3 to the control layer 615 and transmits the signal output from the control layer 615 to the third physical layer 611-3. Each of the signal output from the third physical layer 611-3 and the signal output from the control layer 615 may be implemented as one of a control signal, data, and a packet. The third selector 613-3 transmits the signal output from the third physical layer 611-3 to the control layer 615 through one of the third channel CH2, the seventh channel CH6, the eleventh channel CH10, and the fifteenth channel CH14, based on the channel selection signal CH[1:0]. The third selector 613-3 transmits the signal output from the third physical layer 611-3 to the control layer 615 through the third channel CH2 when the third channel CH2 is selected by the channel selection signal CH[1:0] set to binary bit set "00", transmits the signal output from the third physical layer 611-3 to the control layer 615 through the seventh channel CH6 when the seventh channel CH6 is selected by the channel selection signal CH[1:0] set to binary bit set "01", transmits the signal output from the third physical layer 611-3 to the control layer 615 through the eleventh channel CH10 when the eleventh channel CH10 is selected by the channel selection signal CH[1:0] set to binary bit set "10", and transmits the signal output from the third physical layer 611-3 to the control layer 615 through the fifteenth channel CH14 when the fifteenth channel CH14 is selected by the channel selection signal CH[1:0] set to binary bit set "11". The third selector 613-3 transmits the signal output from the control layer 615 to the third physical layer 611-3 through one of the third channel CH2, the seventh channel CH6, the eleventh channel CH10, and the fifteenth channel CH14, based on the channel selection signals CH[1:0]. The third selector 613-3 transmits the signal output from the control layer 615 to the third physical layer 611-3 through the third channel CH2 when the third channel CH2 is selected by the channel selection signal CH[1:0] set to binary bit set "00", transmits the signal output from the control layer 615 to the third physical layer 611-3 through the seventh channel CH6 when the seventh channel CH6 is selected by the channel selection signal CH[1:0] set to binary bit set "01", transmits the signal output from the control layer 615 to the third physical layer 611-3 through the eleventh channel CH10 when the eleventh channel CH10 is selected by the channel selection signal CH[1:0] set to binary bit set "10", and transmits the signal output from the control layer 615 to the third physical layer 611-3 through the fifteenth channel CH14 when the fifteenth channel CH14 is selected by the channel selection signal CH[1:0] set to binary bit set "11".

The fourth selector 613-4 is electrically connected to the fourth physical layer 611-4 and the control layer 615. The fourth selector 613-4 transmits the signal output from the fourth physical layer 611-4 to the control layer 615 and transmits the signal output from the control layer 615 to the fourth physical layer 611-4. Each of the signal output from the fourth physical layer 611-4 and the signal output from the control layer 615 may be implemented as one of a control signal, data, and a packet. The fourth selector 613-4 transmits the signal output from the fourth physical layer 611-4 to the control layer 615 through one of the fourth channel CH3, the eighth channel CH7, the twelfth channel CH11, and the sixteenth channel CH15, based on the channel selection signal CH[1:0]. The fourth selector 613-4 transmits the signal output from the fourth physical layer 611-4 to the control layer 615 through the fourth channel CH3 when the fourth channel CH3 is selected by the channel selection signal CH[1:0] set to binary bit set "00", transmits the signal output from the fourth physical layer 611-4 to the control layer 615 through the eighth channel CH7 when the eighth channel CH7 is selected by the channel selection signal CH[1:0] set to binary bit set "01", transmits the signal output from the fourth physical layer 611-4 to the control layer 615 through the twelfth channel CH11 when the twelfth channel CH11 is selected by the channel selection signal CH[1:0] set to binary bit set "10", and transmits the signal output from the fourth physical layer 611-4 to the control layer 615 through the sixteenth channel CH15 when the sixteenth channel CH15 is selected by the channel selection signal CH[1:0] set to binary bit set "11".

The fourth selector 613-4 transmits the signal output from the control layer 615 to the fourth physical layer 611-4 through one of the fourth channel CH2, the eighth channel CH7, the twelfth channel CH11, and the sixteenth channel CH15, based on the channel selection signal CH[1:0]. The fourth selector 613-4 transmits the signal output from the control layer 615 to the fourth physical layer 611-4 through the fourth channel CH3 when the fourth channel CH3 is selected by the channel selection signal CH[1:0] set to binary bit set "00", transmits the signal output from the control layer 615 to the fourth physical layer 611-4 through the eighth channel CH7 when the eighth channel CH7 is selected by the channel selection signal CH[1:0] set to binary bit set "01", transmits the signal output from the control layer 615 to the fourth physical layer 611-4 through the twelfth channel CH11 when the twelfth channel CH11 is selected by the channel selection signal CH[1:0] set to binary bit set "10", and transmits the signal output from the control layer 615 to the fourth physical layer 611-4 through the sixteenth channel CH15 when the sixteenth channel CH15 is selected by the channel selection signal CH[1:0] set to binary bit set "11".

It is described that the first channel CH0, the second channel CH1, the third channel CH2, and the fourth channel CH3 are selected when the channel selection signal CH[1:0] is set to binary bit set "00", the fifth channel CH4, the sixth channel CH5, the seventh channel CH6, and the eighth channel CH7 are selected when the channel selection signal CH[1:0] is set to binary bit set "01", the ninth channel CH8, the tenth channel CH9, the eleventh channel CH10, and the twelfth channel CH11 are selected when the channel selection signal CH[1:0] is set to binary bit set "10", and the thirteenth channel CH12, the fourteenth channel CH13, the fifteenth channel CH14, and the sixteenth channel CH15 are selected when the channel selection signal CH[1:0] is set to binary bit set "11". However this is only an example and the present disclosure is not limited thereto.

The control layer 615 includes the first through sixteenth memory control groups (MG) 615-1 through 615-16.

The first memory control group 615-1 is electrically connected to the first selector 613-1 and the transmission layer 617. When the first channel CH0 is selected, the first memory control group 615-1 receives the signal output from the first physical layer 611-1 through the first channel CH0 from the first selector 613-1 and transmits the signal generated based on the signal output from the first physical layer 611-1 to the transmission layer 617. When the first channel CH0 is selected, the first memory control group 615-1 receives the signal output from the transmission layer 617 through the first channel CH0 and transmits the signal generated based on the signal output from the transmission layer 617 to the first selector 613-1.

The second memory control group 615-2 is electrically connected to the first selector 613-1 and the transmission layer 617. When the fifth channel CH4 is selected, the second memory control group 615-2 receives the signal output from the first physical layer 611-1 through the fifth channel CH4 from the first selector 613-1 and transmits the signal generated based on the signal output from the first physical layer 611-1 to the transmission layer 617. When the fifth channel CH4 is selected, the second memory control group 615-2 receives the signal output from the transmission layer 617 through the fifth channel CH4 and transmits the signal generated based on the signal output from the transmission layer 617 to the first selector 613-1.

The third memory control group 615-3 is electrically connected to the first selector 613-1 and the transmission layer 617. When the ninth channel CH8 is selected, the third memory control group 615-3 receives the signal output from the first physical layer 611-1 through the ninth channel CH8 from the first selector 613-1 and transmits the signal generated based on the signal output from the first physical layer 611-1 to the transmission layer 617. When the ninth channel CH8 is selected, the third memory control group 615-3 receives the signal output from the transmission layer 617 through the ninth channel CH8 and transmits the signal generated based on the signal output from the transmission layer 617 to the first selector 613-1.

The fourth memory control group 615-4 is electrically connected to the first selector 613-1 and the transmission layer 617. When the thirteenth channel CH12 is selected, the fourth memory control group 615-4 receives the signal output from the first physical layer 611-1 through the thirteenth channel CH12 from the first selector 613-1 and transmits the signal generated based on the signal output from the first physical layer 611-1 to the transmission layer 617. When the thirteenth channel CH12 is selected, the fourth memory control group 615-3 receives the signal output from the transmission layer 617 through the thirteenth channel CH12 and transmits the signal generated based on the signal output from the transmission layer 617 to the first selector 613-1.

The fifth memory control group 615-5 is electrically connected to the second selector 613-2 and the transmission layer 617. When the second channel CH1 is selected, the fifth memory control group 615-5 receives the signal output from the second physical layer 611-2 through the second channel CH1 from the second selector 613-2 and transmits the signal generated based on the signal output from the second physical layer 611-2 to the transmission layer 617. When the second channel CH1 is selected, the fifth memory control group 615-5 receives the signal output from the transmission layer 617 through the second channel CH1 and transmits the signal generated based on the signal output from the transmission layer 617 to the second selector 613-2.

The sixth memory control group 615-6 is electrically connected to the second selector 613-2 and the transmission layer 617. When the sixth channel CH5 is selected, the sixth memory control group 615-6 receives the signal output from the second physical layer 611-2 through the sixth channel CH5 from the second selector 613-2 and transmits the signal generated based on the signal output from the second physical layer 611-2 to the transmission layer 617. When the sixth channel CH5 is selected, the sixth memory control group 615-6 receives the signal output from the transmission layer 617 through the sixth channel CH5 and transmits the signal generated based on the signal output from the transmission layer 617 to the second selector 613-2.

The seventh memory control group 615-7 is electrically connected to the second selector 613-2 and the transmission layer 617. When the tenth channel CH9 is selected, the seventh memory control group 615-7 receives the signal output from the second physical layer 611-2 through the tenth channel CH9 from the second selector 613-2 and transmits the signal generated based on the signal output from the second physical layer 611-2 to the transmission layer 617. When the tenth channel CH9 is selected, the seventh memory control group 615-7 receives the signal output from the transmission layer 617 through the tenth channel CH9 and transmits the signal generated based on the signal output from the transmission layer 617 to the second selector 613-2.

The eighth memory control group 615-8 is electrically connected to the second selector 613-2 and the transmission layer 617. When the fourteenth channel CH13 is selected, the eighth memory control group 615-8 receives the signal output from the second physical layer 611-2 through the fourteenth channel CH13 from the second selector 613-2 and transmits the signal generated based on the signal output from the second physical layer 611-2 to the transmission layer 617. When the fourteenth channel CH13 is selected, the eighth memory control group 615-8 receives the signal output from the transmission layer 617 through the fourteenth channel CH13 and transmits the signal generated based on the signal output from the transmission layer 617 to the second selector 613-2.

The ninth memory control group 615-9 is electrically connected to the third selector 613-3 and the transmission layer 617. When the third channel CH2 is selected, the ninth memory control group 615-9 receives the signal output from the third physical layer 611-3 through the third channel CH2 from the third selector 613-3 and transmits the signal generated based on the signal output from the third physical layer 611-3 to the transmission layer 617. When the third channel CH2 is selected, the ninth memory control group 615-9 receives the signal output from the transmission layer 617 through the third channel CH2 and transmits the signal generated based on the signal output from the transmission layer 617 to the third selector 613-3.

The tenth memory control group 615-10 is electrically connected to the third selector 613-3 and the transmission layer 617. When the seventh channel CH6 is selected, the tenth memory control group 615-10 receives the signal output from the third physical layer 611-3 through the seventh channel CH6 from the third selector 613-3 and transmits the signal generated based on the signal output from the third physical layer 611-3 to the transmission layer 617. When the seventh channel CH6 is selected, the tenth memory control group 615-10 receives the signal output from the transmission layer 617 through the seventh channel CH6 and transmits the signal generated based on the signal output from the transmission layer 617 to the third selector 613-3.

The eleventh memory control group 615-11 is electrically connected to the third selector 613-3 and the transmission layer 617. When the eleventh channel CH10 is selected, the eleventh memory control group 615-11 receives the signal output from the third physical layer 611-3 through the eleventh channel CH10 from the third selector 613-3 and transmits the signal generated based on the signal output from the third physical layer 611-3 to the transmission layer 617. When the eleventh channel CH10 is selected, the eleventh memory control group 615-11 receives the signal output from the transmission layer 617 through the eleventh channel CH10 and transmits the signal generated based on the signal output from the transmission layer 617 to the third selector 613-3.

The twelfth memory control group 615-12 is electrically connected to the third selector 613-3 and the transmission layer 617. When the fifteenth channel CH14 is selected, the twelfth memory control group 615-12 receives the signal output from the third physical layer 611-3 through the fifteenth channel CH14 from the third selector 613-3 and transmits the signal generated based on the signal output from the third physical layer 611-3 to the transmission layer 617. When the fifteenth channel CH14 is selected, the twelfth memory control group 615-12 receives the signal output from the transmission layer 617 through the fifteenth channel CH14 and transmits the signal generated based on the signal output from the transmission layer 617 to the third selector 613-3.

The thirteenth memory control group 615-13 is electrically connected to the fourth selector 613-4 and the transmission layer 617. When the fourth channel CH3 is selected, the thirteenth memory control group 615-13 receives the signal output from the fourth physical layer 611-4 through the fourth channel CH3 from the fourth selector 613-4 and transmits the signal generated based on the signal output from the fourth physical layer 611-4 to the transmission layer 617. When the fourth channel CH3 is selected, the thirteenth memory control group 615-13 receive the signal output from the transmission layer 617 through the fourth channel CH3 and transmits the signal generated based on the signal output from the transmission layer 617 to the fourth selector 613-4.

The fourteenth memory control group 615-14 is electrically connected to the fourth selector 613-4 and the transmission layer 617. When the eighth channel CH7 is selected, the fourteenth memory control group 615-14 receives the signal output from the fourth physical layer 611-4 through the eighth channel CH7 from the fourth selector 613-4 and transmits the signal generated based on the signal output from the fourth physical layer 611-4 to the transmission layer 617. When the eighth channel CH7 is selected, the fourteenth memory control group 615-14 receives the signal output from the transmission layer 617 through the eighth channel CH7 and transmits the signal generated based on the signal output from the transmission layer 617 to the fourth selector 613-4.

The fifteenth memory control group 615-15 is electrically connected to the fourth selector 613-4 and the transmission layer 617. When the twelfth channel CH11 is selected, the fifteenth memory control group 615-15 receives the signal output from the fourth physical layer 611-4 through the twelfth channel CH11 from the fourth selector 613-4 and transmits the signal generated based on the signal output from the fourth physical layer 611-4 to the transmission layer 617. When the twelfth channel CH11 is selected, the fifteenth memory control group 615-15 receives the signal output from the transmission layer 617 through the twelfth channel CH11 and transmits the signal generated based on the signal output from the transmission layer 617 to the fourth selector 613-4.

The sixteenth memory control group 615-16 is electrically connected to the fourth selector 613-4 and the transmission layer 617. When the sixteenth channel CH15 is selected, the sixteenth memory control group 615-16 receives the signal output from the fourth physical layer 611-4 through the sixteenth channel CH15 from the fourth selector 613-4 and transmits the signal generated based on the signal output from the fourth physical layer 611-4 to the transmission layer 617. When the sixteenth channel CH15 is selected, the sixteenth memory control group 615-16 receives the signal output from the transmission layer 617 through the sixteenth channel CH15 and transmits the signal generated based on the signal output from the transmission layer 617 to the fourth selector 613-4.

The transmission layer 617 includes first through sixteenth core control circuits (CT) 617-1 through 617-16.

The first core control circuit 617-1 is electrically connected to the first memory control group 615-1. When the first channel CH0 is selected, the first core control circuit 617-1 receives the signal output from the first memory control group 615-1 through the first channel CH0 and transmits the signal generated based on the signal output from the first memory control group 615-1 to the core chip through the first channel CH0. When the first channel CH0 is selected, the first core control circuit 617-1 receives the internal data output from the core chip through the first channel CH0 and transmits the signal generated based on the internal data to the first memory control group 615-1 through the first channel CH0.

The second core control circuit 617-2 is electrically connected to the second memory control group 615-2. When the fifth channel CH4 is selected, the second core control circuit 617-2 receives the signal output from the second memory control group 615-2 through the fifth channel CH4 and transmits the signal generated based on the signal output from the second memory control group 615-2 to the core chip through the fifth channel CH4. When the fifth channel CH4 is selected, the second core control circuit 617-2 receives the internal data output from the core chip through the fifth channel CH4 and transmits the signal generated based on the internal data to the second memory control group 615-2 through the fifth channel CH4.

The third core control circuit 617-3 is electrically connected to the third memory control group 615-3. When the ninth channel CH8 is selected, the third core control circuit 617-3 receives the signal output from the third memory control group 615-3 through the ninth channel CH8 and transmits the signal generated based on the signal output from the third memory control group 615-3 to the core chip through the ninth channel CH8. When the ninth channel CH8 is selected, the third core control circuit 617-3 receives the internal data output from the core chip through the ninth channel CH8 and transmits the signal generated based on the internal data to the third memory control group 615-3 through the ninth channel CH8.

The fourth core control circuit 617-4 is electrically connected to the fourth memory control group 615-4. When the thirteenth channel CH12 is selected, the fourth core control circuit 617-4 receives the signal output from the fourth memory control group 615-4 through the thirteenth channel CH12 and transmits the signal generated based on the signal output from the fourth memory control group 615-4 to the core chip through the thirteenth channel CH12. When the thirteenth channel CH12 is selected, the fourth core control circuit 617-4 receives the internal data output from the core chip through the thirteenth channel CH12 and transmits the signal generated based on the internal data to the fourth memory control group 615-4 through the thirteenth channel CH12.

The fifth core control circuit 617-5 is electrically connected to the fifth memory control group 615-5. When the second channel CH1 is selected, the fifth core control circuit 617-5 receives the signal output from the fifth memory control group 615-5 through the second channel CH1 and transmits the signal generated based on the signal output from the fifth memory control group 615-5 to the core chip through the second channel CH1. When the second channel CH1 is selected, the fifth core control circuit 617-5 receives the internal data output from the core chip through the second channel CH1 and transmits the signal generated based on the internal data to the fifth memory control group 615-5 through the second channel CH1.

The sixth core control circuit 617-6 is electrically connected to the sixth memory control group 615-6. When the sixth channel CH5 is selected, the sixth core control circuit 617-6 receives the signal output from the sixth memory control group 615-6 through the sixth channel CH5 and transmits the signal generated based on the signal output from the sixth memory control group 615-6 to the core chip through the sixth channel CH5. When the sixth channel CH5 is selected, the sixth core control circuit 617-6 receives the internal data output from the core chip through the sixth channel CH5 and transmits the signal generated based on the internal data to the sixth memory control group 615-6 through the sixth channel CH5.

The seventh core control circuit 617-7 is electrically connected to the seventh memory control group 615-7. When the tenth channel CH9 is selected, the seventh core control circuit 617-7 receives the signal output from the seventh memory control group 615-7 through the tenth channel CH9 and transmits the signal generated based on the signal output from the seventh memory control group 615-7 to the core chip through the tenth channel CH9. When the tenth channel CH9 is selected, the seventh core control circuit 617-7 receives the internal data output from the core chip through the tenth channel CH9 and transmits the signal generated based on the internal data to the seventh memory control group 615-7 through the tenth channel CH9.

The eighth core control circuit 617-8 is electrically connected to the eighth memory control group 615-8. When the fourteenth channel CH13 is selected, the eighth core control circuit 617-8 receives the signal output from the eighth memory control group 615-8 through the fourteenth channel CH13 and transmits the signal generated based on the signal output from the eighth memory control group 615-8 to the core chip through the fourteenth channel CH13. When the fourteenth channel CH13 is selected, the eighth core control circuit 617-8 receives the internal data output from the core chip through the fourteenth channel CH13 and transmits the signal generated based on the internal data to the eighth memory control group 615-8 through the fourteenth channel CH13.

The ninth core control circuit 617-9 is electrically connected to the ninth memory control group 615-9. When the third channel CH2 is selected, the ninth core control circuit 617-9 receives the signal output from the ninth memory control group 615-9 through the third channel CH2 and transmits the signal generated based on the signal output from the ninth memory control group 615-9 to the core chip through the third channel CH2. When the third channel CH2 is selected, the ninth core control circuit 617-9 receives the internal data output from the core chip through the third channel CH2 and transmits the signal generated based on the internal data to the ninth memory control group 615-9 through the third channel CH2.

The tenth core control circuit 617-10 is electrically connected to the tenth memory control group 615-10. When the seventh channel CH6 is selected, the tenth core control circuit 617-10 receives the signal output from the tenth memory control group 615-10 through the seventh channel CH6 and transmits the signal generated based on the signal output from the tenth memory control group 615-10 to the core chip through the seventh channel CH6. When the seventh channel CH6 is selected, the tenth core control circuit 617-10 receives the internal data output from the core chip through the seventh channel CH6 and transmits the signal generated based on the internal data to the tenth memory control group 615-10 through the seventh channel CH6.

The eleventh core control circuit 617-11 is electrically connected to the eleventh memory control group 615-11. When the eleventh channel CH10 is selected, the eleventh core control circuit 617-11 receives the signal output from the eleventh memory control group 615-11 through the eleventh channel CH10 and transmits the signal generated based on the signal output from the eleventh memory control group 615-11 to the core chip through the eleventh channel CH10. When the eleventh channel CH10 is selected, the eleventh core control circuit 617-11 receives the internal data output from the core chip through the eleventh channel CH10 and transmits the signal generated based on the internal data to the eleventh memory control group 615-11 through the eleventh channel CH10.

The twelfth core control circuit 617-12 is electrically connected to the twelfth memory control group 615-12. When the fifteenth channel CH14 is selected, the twelfth core control circuit 617-12 receives the signal output from the twelfth memory control group 615-12 through the fifteenth channel CH14 and transmits the signal generated based on the signal output from the twelfth memory control group 615-12 to the core chip through the fifteenth channel CH14. When the fifteenth channel CH14 is selected, the twelfth core control circuit 617-12 receives the internal data output from the core chip through the fifteenth channel CH14 and transmits the signal generated based on the internal data to the twelfth memory control group 615-12 through the fifteenth channel CH14.

The thirteenth core control circuit 617-13 is electrically connected to the thirteenth memory control group 615-13. When the fourth channel CH3 is selected, the thirteenth core control circuit 617-13 receives the signal output from the thirteenth memory control group 615-13 through the fourth channel CH3 and transmits the signal generated based on the signal output from the thirteenth memory control group 615-13 to the core chip through the fourth channel CH3. When the fourth channel CH3 is selected, the thirteenth core control circuit 617-13 receives the internal data output from the core chip through the fourth channel CH3 and transmits the signal generated based on the internal data to the thirteenth memory control group 615-13 through the fourth channel CH3.

The fourteenth core control circuit 617-14 is electrically connected to the fourteenth memory control group 615-14. When the eighth channel CH7 is selected, the fourteenth core control circuit 617-14 receives the signal output from the fourteenth memory control group 615-14 through the eighth channel CH7 and transmits the signal generated based on the signal output from the fourteenth memory control group 615-14 to the core chip through the eighth channel CH7. When the eighth channel CH7 is selected, the fourteenth core control circuit 617-14 receives the internal data output from the core chip through the eighth channel CH7 and transmits the signal generated based on the internal data to the fourteenth memory control group 615-14 through the eighth channel CH7.

The fifteenth core control circuit 617-15 is electrically connected to the fifteenth memory control group 615-15. When the twelfth channel CH11 is selected, the fifteenth core control circuit 617-15 receives the signal output from the fifteenth memory control group 615-15 through the twelfth channel CH11 and transmits the signal generated based on the signal output from the fifteenth memory control group 615-15 to the core chip through the twelfth channel CH11. When the twelfth channel CH11 is selected, the fifteenth core control circuit 617-15 receives the internal data output from the core chip through the twelfth channel CH11 and transmits the signal generated based on the internal data to the fifteenth memory control group 615-15 through the twelfth channel CH11.

The sixteenth core control circuit 617-16 is electrically connected to the sixteenth memory control group 615-16. When the sixteenth channel CH15 is selected, the sixteenth core control circuit 617-16 receives the signal output from the sixteenth memory control group 615-16 through the sixteenth channel CH15 and transmits the signal generated based on the signal output from the sixteenth memory control group 615-16 to the core chip through the sixteenth channel CH15. When the sixteenth channel CH15 is selected, the sixteenth core control circuit 617-16 receives the internal data output from the core chip through the sixteenth channel CH15 and transmits the signal generated based on the internal data to the sixteenth memory control group 615-16 through the sixteenth channel CH15.

Depending on the embodiment, each of the first through sixteenth channels CH0 through CH15 may be connected to a separate core chip. For example, the first channel CH0 may be connected to the first core chip, and the second channel CH1 may be connected to the second core chip. In the same manner, the sixteenth channel CH15 may be connected to the sixteenth core chip. Each of the first through sixteenth core chips may be implemented with different types of memory depending on the embodiment.

As described above, in an embodiment, the base chip 61 allows each of the first through fourth physical layers (PHY) 611-1 through 611-4 included in the physical layer 611 to be selectively connected to the plurality of channels CH0 through CH15 through the first through fourth selectors 613-1 through 613-4 included in the selection circuit 613, thereby reducing the number of first through fourth physical layers (PHY) 611-1 through 611-4 included in the physical layer 611 and reducing the layout area. Accordingly, in an embodiment, the area efficiency of the stacked memory device using the base chip 61 can be improved.

Figure 15:
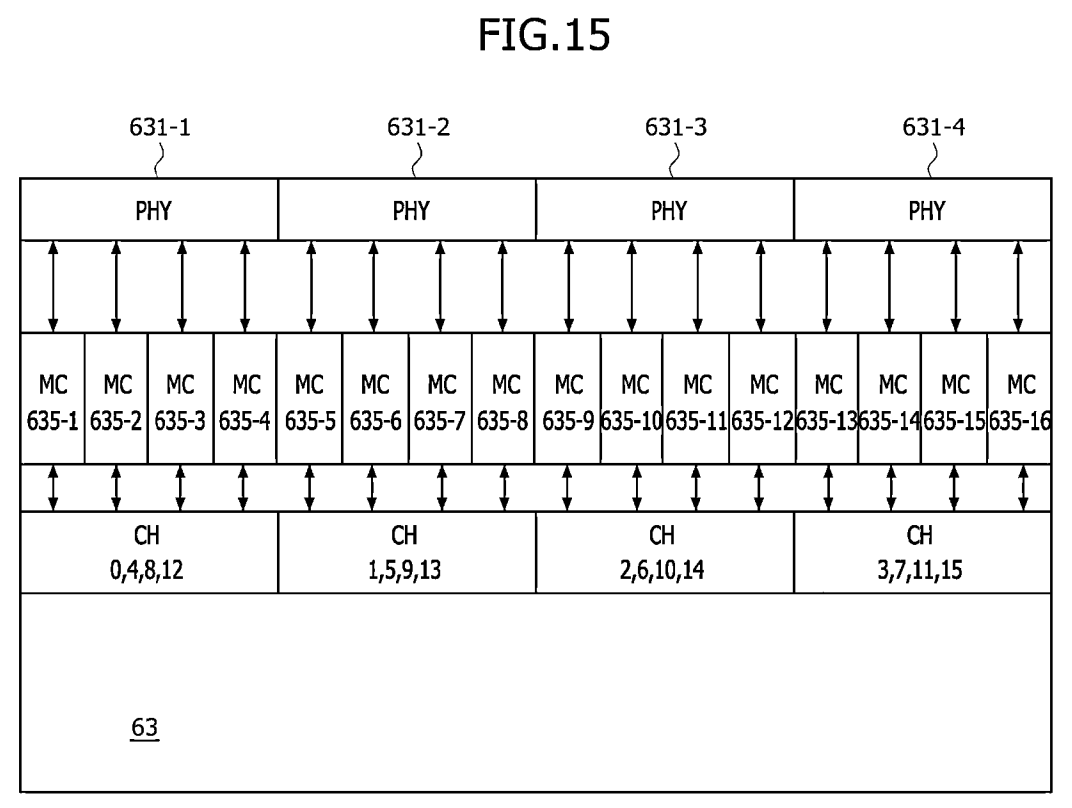

FIG. 15 is a block diagram illustrating an embodiment of a base chip 63 included in the stack memory device. As shown in FIG. 15, the base chip 63 includes first through fourth physical layers (PHY) 631-1 through 631-4, first through sixteenth memory controllers (MC) 635-1 through 635-15, and first through sixteenth channels CH0 through CH15.

The first physical layer 631-1 is shared by the first memory controller 635-1, the second memory controller 635-2, the third memory controller 635-3, and the fourth memory controller 635-4. The first memory controller 635-1 receives or transmits a signal through the first channel CH0. The second memory controller 635-2 receives or transmits a signal through the fifth channel CH4. The third memory controller 635-3 receives or transmits a signal through the ninth channel CH8. The fourth memory controller 635-4 receives or transmits a signal through the thirteenth channel CH12.

The second physical layer 631-2 is shared by the fifth memory controller 635-5, the sixth memory controller 635-6, the seventh memory controller 635-7, and the eighth memory controller 635-8. The fifth memory controller 635-5 receives or transmits a signal through the second channel CH1. The sixth memory controller 635-6 receives or transmits a signal through the sixth channel CH5. The seventh memory controller 635-7 receives or transmits a signal through the tenth channel CH9. The eighth memory controller 635-8 receives or transmits a signal through the fourteenth channel CH13.

The third physical layer 631-3 is shared by the ninth memory controller 635-9, the tenth memory controller 635-10, the eleventh memory controller 635-11, and the twelfth memory controller 635-12. The ninth memory controller 635-9 receives or transmits a signal through the third channel CH2. The tenth memory controller 635-10 receives or transmits a signal through the seventh channel CH6. The eleventh memory controller 635-11 receives or transmits a signal through the eleventh channel CH10. The twelfth memory controller 635-12 receives or transmits a signal through the fifteenth channel CH14.

The fourth physical layer 631-4 is shared by the thirteenth memory controller 635-13, the fourteenth memory controller 635-14, the fifteenth memory controller 635-15, and the sixteenth memory controller 635-16. The thirteenth memory controller 635-13 receives or transmits a signal through the fourth channel CH3. The fourteenth memory controller 635-14 receives or transmits a signal through the eighth channel CH7. The fifteenth memory controller 635-15 receives or transmits a signal through the twelfth channel CH11. The sixteenth memory controller 635-16 receives or transmits a signal through the sixteenth channel CH15.

Concepts are disclosed in conjunction with various embodiments as described above. Those skilled in the art will understand that various modifications, additions, and substitutions are possible, without departing from the scope and spirit of the present disclosure. Accordingly, the embodiments disclosed in the present specification should not be considered from a restrictive standpoint but rather from an illustrative standpoint. The scope of the present disclosure is not limited to the above descriptions, and all of distinctive features within an equivalent scope should be construed as being included in the present disclosure.

What is claimed is:

1. A stack memory device comprising:
a physical layer configured to receive write data, a write valid signal, and a transmission write clock signal from an external device and transmit read data, a read valid signal, and a transmission read clock signal to the external device;
a selector configured to output a signal output from the physical layer through a first channel or a second channel, based on a channel selection signal; and
a control layer configured to receive an output signal of the selector through the first channel or the second channel to generate a control command and an address for controlling a write operation or a read operation within a core chip,
wherein the control layer comprises a first memory control group configured to receive the signal output from the physical layer through the first channel to generate the control command and the address when the channel selection signal is at a first logic level.

2. The stack memory device of claim 1,
wherein the selector is configured to output the signal output from the physical layer to the control layer through the first channel when the channel selection signal is at the first logic level.

3. The stack memory device of claim 1,
wherein the first memory control group comprises an interface converting circuit configured to convert an interface on the control command and the address to output a converted interface through the first channel.

4. The stack memory device of claim 1, further comprising a first core control circuit configured to perform the write operation and the read operation on the core chip, based on the control command and the address that are generated in the first memory control group.

5. The stack memory device of claim 1,
wherein the selector is configured to output the signal output from the physical layer to the control layer through the second channel when the channel selection signal is at a second logic level.

6. The stack memory device of claim 5,
wherein the control layer comprises a second memory control group configured to receive the signal output from the physical layer through the second channel through the selector to generate the control command and the address when the channel selection signal is at the second logic level.

7. The stack memory device of claim 6,
wherein the second memory control group comprises an interface converting circuit configured to convert an interface on the control command and the address to output a converted interface through the second channel.

8. The stack memory device of claim 6, further comprising a second core control circuit configured to perform the write operation and the read operation on the core chip, based on the control command and the address that are generated in the second memory control group.

9. A stack memory device comprising:
a first physical layer configured to receive a signal from an external device and transmit a signal to the external device;
a first selector configured to output a signal output from the first physical layer through a first channel or a second channel, based on a channel selection signal;
a first memory control group configured to receive the signal output from the first physical layer through the first channel through the first selector to generate a control command and an address, based on the channel selection signal; and
a second memory control group configured to receive the signal output from the first physical layer through the second channel through the first selector to generate the control command and the address, based on the channel selection signal,
wherein the first selector is configured to output the signal output from the first physical layer to the first memory control group through the first channel when the channel selection signal is at a first logic level.

10. The stack memory device of claim 9,
wherein the first selector is configured to output the signal output from the first physical layer to the second memory control group through the second channel when the channel selection signal is at a second logic level.

11. The stack memory device of claim 9, further comprising a first core control circuit configured to perform the write operation and the read operation on the core chip, based on the control command and the address that are generated in the first memory control group.

12. The stack memory device of claim 9, further comprising a second core control circuit configured to perform the write operation and the read operation on the core chip, based on the control command and the address that are generated in the second memory control group.

13. The stack memory device of claim 9, further comprising:
a second physical layer configured to receive a signal from the external device and transmit a signal to the external device; and
a second selector configured to output a signal output from the second physical layer through a third channel or a fourth channel, based on the channel selection signal.

14. The stack memory device of claim 13, further comprising:

a third memory control group configured to receive the signal output from the second physical layer through the third channel through the second selector to generate the control command and the address, based on the channel selection signal; and a fourth memory control group configured to receive the signal output from the second physical layer through the fourth channel through the second selector to generate the control command and the address, based on the channel selection signal.

15. The stack memory device of claim 14, wherein the second selector is configured to:

output the signal output from the second physical layer to the third memory control group through the third channel when the channel selection signal is at a first logic level, and output the signal output from the second physical layer to the fourth memory control group through the fourth channel when the channel selection signal is at a second logic level.

16. The stack memory device of claim 15, further comprising a third core control circuit configured to perform the write operation and the read operation on the core chip, based on the control command and the address that are generated in the third memory control group.

17. The stack memory device of claim 15, further comprising a fourth core control circuit configured to perform the write operation and the read operation on the core chip, based on the control command and the address that are generated in the fourth memory control group.

18. A stack memory device comprising:

a base chip; and a core chip stacked on the base chip and electrically connected to the base chip, wherein the base chip comprises:

a physical layer configured to receive a signal from an external device and transmit a signal to the external device;

a selector configured to output a signal output from the physical layer through a first channel or a second channel, based on a channel selection signal; and a control layer configured to receive an output signal of the selector through the first channel or the second channel to generate a control command and an address for controlling a write operation or a read operation within the core chip, wherein the control layer comprises a first memory control group configured to receive the signal output from the physical layer through the first channel to generate the control command and the address when the channel selection signal is at a first logic level.

19. The stack memory device of claim 18, wherein the control layer comprises a second memory control group configured to receive the signal output from the physical layer through the second channel through the selector to generate the control command and the address when the channel selection signal is at a second logic level.

* * * * *